US011159444B2

(12) United States Patent
Nishimura

(10) Patent No.: US 11,159,444 B2
(45) Date of Patent: Oct. 26, 2021

(54) PACKET PROCESSING DEVICE AND PACKET PROCESSING METHOD

(71) Applicant: FUJITSU LIMITED, Kawasaki (JP)

(72) Inventor: Kazuto Nishimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 244 days.

(21) Appl. No.: 16/266,756

(22) Filed: Feb. 4, 2019

(65) Prior Publication Data

US 2019/0306075 A1    Oct. 3, 2019

(30) Foreign Application Priority Data

Mar. 27, 2018    (JP) .............................. JP2018-060864

(51) Int. Cl.
*H04L 12/865* (2013.01)
*H04L 12/937* (2013.01)
(Continued)

(52) U.S. Cl.
CPC ........ *H04L 47/6275* (2013.01); *H04L 47/562* (2013.01); *H04L 49/254* (2013.01); *H04L 49/90* (2013.01)

(58) Field of Classification Search
CPC ... H04L 47/6275; H04L 49/254; H04L 49/90; H04L 47/562; H04L 43/16; H04L 43/067; H04L 43/0894
See application file for complete search history.

(56) References Cited

U.S. PATENT DOCUMENTS 5,742,606 A    4/1998    Iliadis et al.
6,005,868 A    12/1999    Ito
(Continued)

FOREIGN PATENT DOCUMENTS

JP    9-504672    5/1997
JP    10-107803    4/1998
(Continued)

OTHER PUBLICATIONS

D. Hisano et al., "Gate-Shrunk Time Aware Shaper: Low-Latency Converged Network for 5G Fronthaul and M2M Services," GLOBECOM 2017—2017 IEEE Global Communications Conference, Singapore, 2017, pp. 1-6 (Year: 2017).*
(Continued)

*Primary Examiner* — Justin T Van Roie
(74) *Attorney, Agent, or Firm* — Staas & Halsey, LLP

(57) ABSTRACT

A packet processing device includes a first unit, a second unit, and a switching unit. The first unit counts the number of arrived packets in a first period that is from the time slot present after a priority section up to the end of the initial time slot in the subsequently-arriving priority section. When the counted number of arrived packets is positive, the first unit determines that forward mismatch has occurred in an observation cycle. The second unit counts the number of arrived packets in a second period which is from the time slot present immediately after the priority section in the first period of time up to the end of the initial time slot of burst sections in the subsequently-arriving priority section. When the counted number of arrived packets is "0", the second unit determines that backward mismatch has occurred in the observation cycle.

6 Claims, 24 Drawing Sheets

(51) Int. Cl.
H04L 12/861 (2013.01)
H04L 12/875 (2013.01)

(56) References Cited

U.S. PATENT DOCUMENTS

| | | | |
|---|---|---|---|
| 2002/0141454 A1* | 10/2002 | Muniere | H04L 47/10 370/535 |
| 2003/0072261 A1 | 4/2003 | Shinagawa | |
| 2003/0202525 A1 | 10/2003 | Nagatomo | |
| 2014/0321275 A1* | 10/2014 | Anand | H04L 47/6275 370/232 |
| 2019/0166061 A1* | 5/2019 | Farkas | H04L 47/621 |

FOREIGN PATENT DOCUMENTS

| | | |
|---|---|---|
| JP | 2001-244979 | 9/2001 |
| JP | 2003-124980 | 4/2003 |
| JP | 2003-318964 | 11/2003 |
| JP | 2016-116026 | 6/2016 |
| WO | WO-2014050125 A1 * 4/2014 | ............ H04L 47/26 |

OTHER PUBLICATIONS

He, Feng et al. "Impact Analysis of Flow Shaping in Ethernet-AVB/TSN and AFDX from Network Calculus and Simulation Perspective." Sensors (Basel, Switzerland) vol. 17, 5 1181. May 22, 2017 (Year: 2017).*

Kazuto Nishimura et al., "Study of low-latency layer 2 switch architecture for mobile front haul", IEICE Technical Report, The Institute of Electronics, Information and Communication Engineers, vol. 117, No. 4, pp. 37-42.

Office Action, dated Aug. 10, 2021, in corresponding Japanese Patent Application No. 2018-060864 (6 pp.).

* cited by examiner

FIG.4

| TS NUMBER | FIRST GATE | SECOND GATE | HOLDING PERIOD |
|---|---|---|---|
| 0 | O | O | 70 μs |
| 1 | O | O | 70 μs |
| 2 | O | O | 70 μs |
| 3 | O | O | 70 μs |
| 4 | O | O→C | 70 μs |
| 5 | O | O→C | 70 μs |
| 6 | O | O→C | 70 μs |
| 7 | O | O→C | 70 μs |
| 8 | O | O→C | 70 μs |
| 9 | O | O | 70 μs |
| ⋮ | | | |
| 13 | O | O | 70 μs |
| 14 | O | O | 70 μs |

FIG.8

| TS NUMBER | FIRST GATE | SECOND GATE | HOLDING PERIOD |
|---|---|---|---|
| 0 | O | O | 70 μs |
| 1 | O | O | 70 μs |
| 2 | O | O | 70 μs |
| 3 | O | O→C | 70 μs |
| 4 | O | C | 70 μs |
| 5 | O | C | 70 μs |
| 6 | O | C | 70 μs |
| 7 | O | C | 70 μs |
| 8 | O | C→O | 70 μs |
| 9 | O | O | 70 μs |
| ⋮ | | | |
| 13 | O | O | 70 μs |
| 14 | O | O | 70 μs |

FIG.17

| TS NUMBER (26A) | FIRST GATE (26B) | SECOND GATE (26C) | HOLDING PERIOD (26D) |
|---|---|---|---|
| 0 | O | O | 200 μs |
| 1 | O | O | 200 μs |
| 2 | O | O | 200 μs |
| 3 | O | C | 200 μs |
| 4 | O | C | 200 μs |
| 5 | O | C | 200 μs |
| ⋮ | | | |
| N | O | O | 215 μs ← ~~216 μs~~ |

[1 CYCLE] ~~1216 μs~~ ↓ 1215 μs

SHORTENING OF LAST TIME SLOT

FIG.18

| TS NUMBER (26A) | FIRST GATE (26B) | SECOND GATE (26C) | HOLDING PERIOD (26D) |
|---|---|---|---|
| 0 | O | O | 200 μs |
| 1 | O | O | 200 μs |
| 2 | O | O | 200 μs |
| 3 | O | C | 200 μs |
| 4 | O | C | 200 μs |
| 5 | O | C | 200 μs |
| ⋮ | | | |
| N | O | O | 217 μs ← 216 μs |

[1 CYCLE] 1216 μs → 1217 μs

EXTENSION OF LAST TIME SLOT

PACKET PROCESSING DEVICE AND PACKET PROCESSING METHOD

CROSS-REFERENCE TO RELATED APPLICATION

This application is based upon and claims the benefit of priority of the prior Japanese Patent Application No. 2018-060864, filed on Mar. 27, 2018, the entire contents of which are incorporated herein by reference.

FIELD

The embodiment discussed herein is related to a packet processing device and a packet processing method.

BACKGROUND

In recent years, with the aim of implementing the fifth-generation mobile communication system (5G), the use of a centralized radio access network (C-RAN), which is configured with baseband units (BBUs) and remote radio heads (RRHs), is being considered. Regarding the mobile front haul (MFH) line laid among the BBUs and the RRHs; the use of a common public radio interface (CPRI) method, in which the wireless analog signals are transmitted with almost no modification, is being considered.

In a communication system connected to an MFH line, since the information is treated as Layer 2 packets, it becomes possible to achieve network sharing with a mobile back haul (MBH) line or a wired network used in connecting the base stations. However, in a communication system, MFH packets from the MFH line suffer from an output delay due to the competition with other packets such as MBH packets from the MBH line. In that regard, a priority control operation is known for holding down the output delay. In the priority control operation, trailing high-priority packets are read on a priority basis over low-priority packets that are queued, thereby enabling holding down the output delay of the high-priority packets, that is, MFH packets.

However, in the priority control operation, if a high-priority packet arrives while a low-priority packet is being read, the reading operation of the high-priority packet is suspended until the low-priority packet being read is completely read and output. It results in waiting for a period equivalent to approximately one packet at the maximum. For example, when the link speed is 1 Gbps and when the packet length is 9000 bytes, there occurs an output delay of about 7 microseconds. In the MFH line, the output delay among the RRHs and BBUs is demanded to be equal to or shorter than 100 microseconds. Hence, in the case of a multilevel node configuration, the output delay equivalent to one packet can be no more ignored.

In that regard, as a method for holding down further output delay, IEEE 802.1 TSN standard (IEEE stands for Institute of Electrical and Electronics Engineers, TSN stands for Time Sensitive Networking) is being considered. The TSN technology includes a time aware shaper (TAS) method called IEEE 802.1 Qbv standard serving as a data plane function for holding down the output delay of packets.

[Patent Literature 1] Japanese Laid-open Patent Publication No. 10-107803

[Patent Literature 2] Japanese Laid-open Patent Publication No. 2003-318964

[Patent Literature 3] Japanese National Publication of International Patent Application No. 09-594672

[Patent Literature 4] Japanese Laid-open Patent Publication No. 2016-116026

For example, consider a communication system in which packet switches having the TAS method implemented therein are arranged over a plurality of levels. In that case, in order to ensure that the packet switches output MFH packets on a priority basis as high-priority packets, the transmission timing of the transmitting end of the MFH packets and the gate-by-gate transmission delay of the packet switches needs to be taken into account, and accordingly the opening and closing timings of the gates across the entire communication system need to be adjusted.

SUMMARY

According to an aspect of an embodiment, a packet processing device processes arrived packets which are received in each time slot having a predetermined period of time. The packet processing device includes a plurality of memories configured to store the arrived packets according to types of the arrived packets; and a processor. The processor is configured to open and close output of each of the memories; and measure, based on number of the arrived packets in each time slot, a burst section in which the arrived packets arrive and measure an observation cycle in which the burst section is observed. The processor is further configured to control the opening and the closing for a priority section which includes the burst section and a section including time slot present immediately before the burst section and time slot present immediately after the burst section and in which the arrived packets of predetermined types are output on a priority. The processor is further configured to count the number of the arrived packets in a first period of time which is from time slot present immediately after the priority section up to end of initial time slot in the priority section arriving subsequently; and determine, when the counted number of the arrived packets is positive, that a forward mismatch has occurred in the observation cycle. The processor is further configured to count the number of the arrived packets in a second period of time which is from time slot present immediately after the priority section in the first period of time up to end of initial time slot of the burst section in the priority section arriving subsequently; and determine, when the counted number of the arrived packets is "0", that a backward mismatch has occurred in the observation cycle.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory diagram of an example of a list table;

FIG. 8 is an explanatory diagram illustrating an example of the list table after the correction against forward mismatch is performed;

FIG. 17 is an explanatory diagram illustrating an example of the list table when a second correcting unit performs forward mismatch correction;

FIG. 18 is an explanatory diagram illustrating an example of the list table when the second correcting unit performs backward mismatch correction;

DESCRIPTION OF EMBODIMENT

However, the disclosed technology is not limited by the embodiment. Moreover, the embodiment can be appropriately combined without causing any contradiction.

Figure 1:
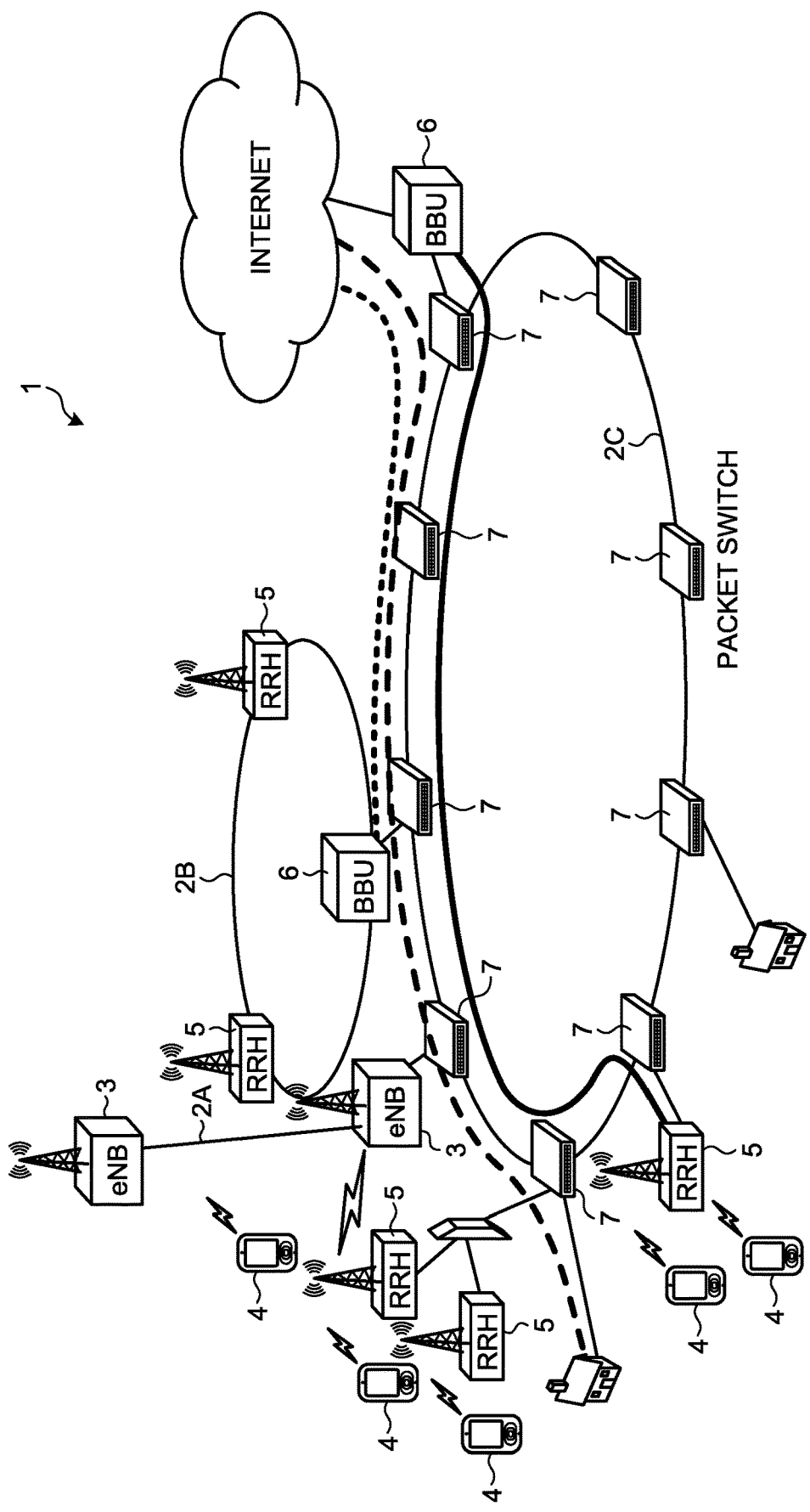
FIG. 1 is an explanatory diagram illustrating an example of a communication system according to an embodiment.

FIG. 1 is an explanatory diagram illustrating an example of a communication system 1 according to the embodiment. The communication system 1 includes an MBH line 2A, an MFH line 2B, and a backbone line 2C. The MBH line 2A is used for connecting a plurality of base stations (eNB: evolved Nodes B) 3. The base stations 3 establish wireless connection with wireless terminals 4 via wireless antennas. The MFH line 2B is used in connecting RRHs 5 and BBUs 6. The RRHs 5 establish wireless connection with the wireless terminals 4. In the MFH line 2B, the CPRI method is implemented for transmission of wireless signals between the RRHs 5 and the BBUs 6 using MFH packets of L2 frames. The backbone line 2C establishes connection also with other wired networks besides the MBH line 2A and the MFH line 2B, and transmits various types of packets such as MBH packets output from the MBH line 2A and MFH packets output from the MFH line 2B. As far as the output delay is concerned, there is a stronger demand for holding down the output delay in MFH packets as compared to MBH packets.

The BBUs 6 are equipped with a scheduling function for wireless regions. The scheduling function is meant for deciding on various elements, such as user data, the code rate, and the modulation method, that need to be transmitted in a single sub-frame. The BBUs 6 divide the user data into L2 frames and transmit MFH packets to the RRHs 5. That is, the BBUs 6 transmit MFH packets to the RRHs 5 at sub-frame intervals such as at the intervals of 1 millisecond. The RRHs divide the received user data of wireless signals into L2 frames, and transmit MFH packets to the BBUs 6.

The backbone line 2C has a plurality of packet switches 7 arranged therein, and transmits MBH packets from the MBH line 2A and MFH packets from the MFH line 2B. The packet switches 7 transmit various other types of packets besides MBH packets and MFH packets. The packet switches 7 have the time aware shaper (TAS) method called IEEE 802.1 Qbv standard implemented therein, and output MFH packets as high-priority packets.

Figure 2:
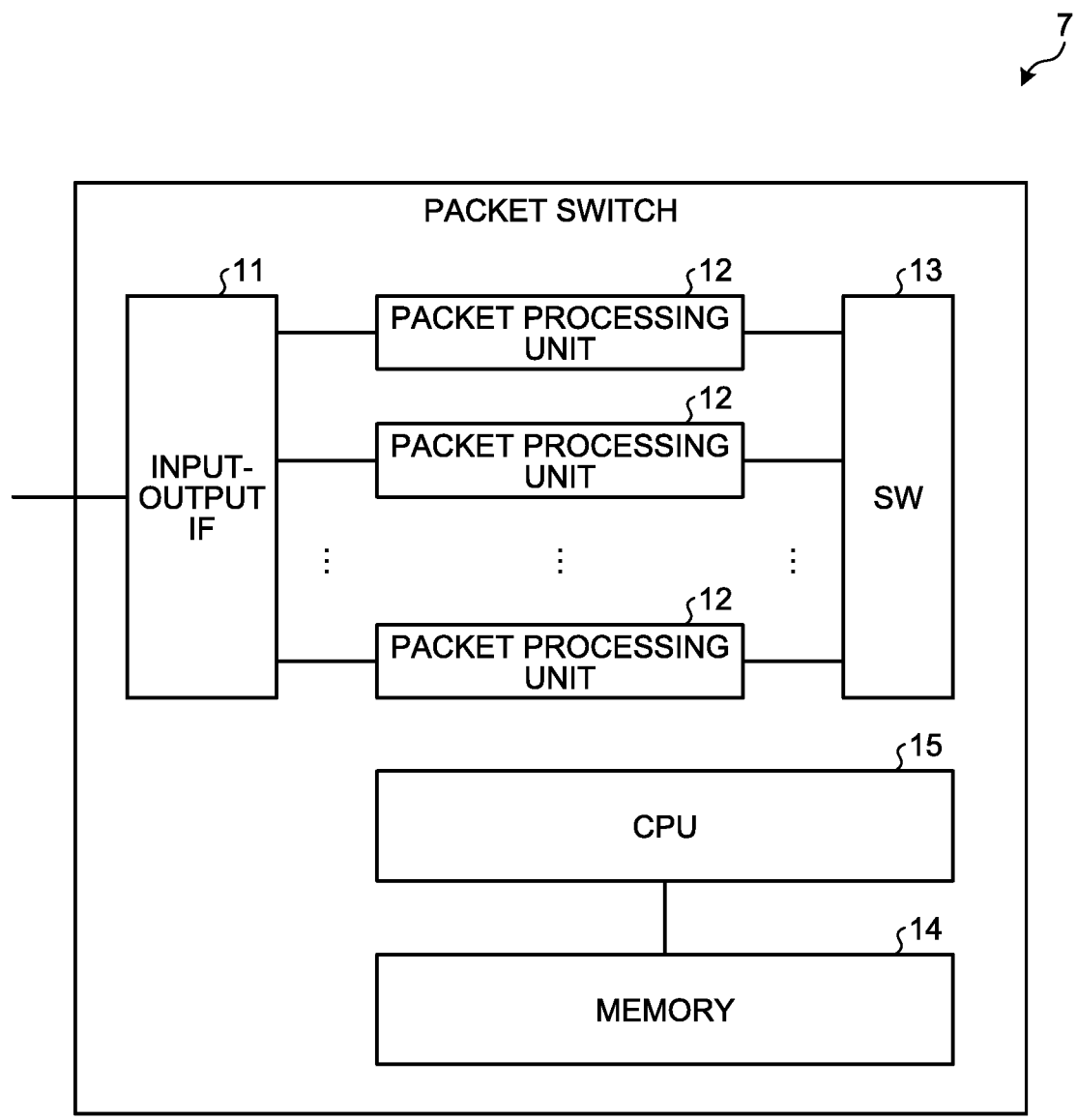
FIG. 2 is an explanatory diagram illustrating an exemplary hardware configuration of a packet switch.

FIG. 2 is an explanatory diagram illustrating an exemplary hardware configuration of the packet switch 7. The packet switch 7 illustrated in FIG. 2 includes an input-output interface (IF) 11, a plurality of packet processing units 12, a switch (SW) 13, a memory 14, and a central processing unit (CPU) 15. The input-output IF 11 establishes connection with various lines such as the backbone line 2C, and receives input of packets and outputs packets. For example, the input-output IF 11 establishes connection with the RRHs 5, the BBUs 6, and the other packet switches 7 connected to the backbone line 2C. The packet processing units 12 perform packet processing suitable for the TAS method. The SW 13 is a switch for switching between the input and the output of the packet processing units 12. The memory 14 is an area for storing a variety of information. The CPU 15 controls the packet switch 7 in entirety.

Figure 3:
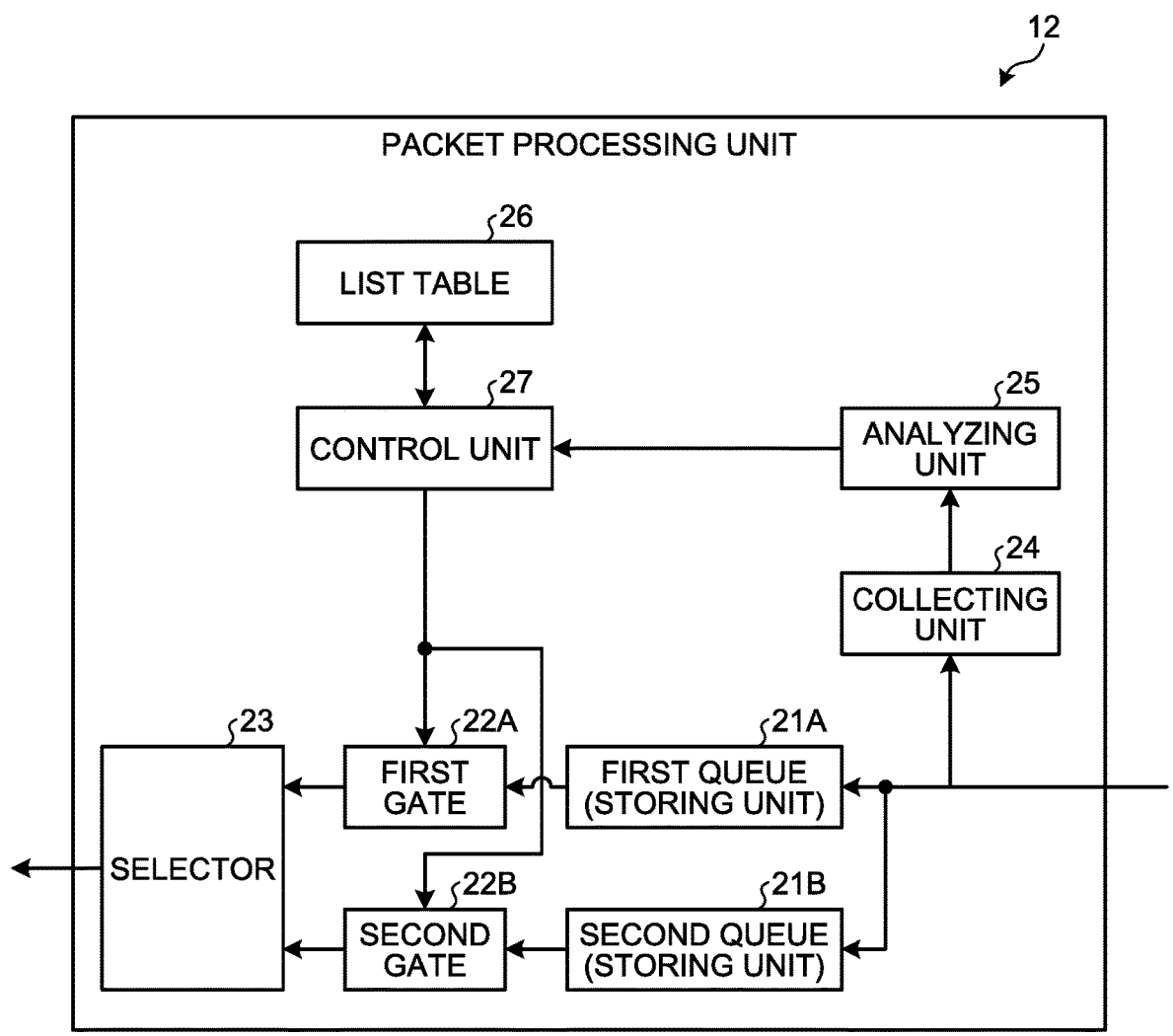
FIG. 3 is an explanatory diagram illustrating an exemplary configuration of a packet processing unit.

FIG. 3 is an explanatory diagram illustrating an example of the packet processing unit 12. The packet processing unit 12 illustrated in FIG. 3 includes a first queue 21A, a second queue 21B, a first gate 22A, a second gate 22B, a selector 23, a collecting unit 24, an analyzing unit 25, a list table 26, and a control unit 27. The first queue 21A represents a storing unit for queuing MFH packets from among the reception packets that have arrived. The first queue 21A identifies the P bit of the VLAN tag in the reception packets and, if a particular reception packet is an MFH packet based on the identification result, queues that MFH packet. The second queue 21B represents a storing unit for queuing, for example, non-MFH packets such as MBH packets from among the reception packets that have arrived. The second queue 21B identifies the P bit of the VLAN tag in the reception tags and, if a particular reception packet is a non-MFH packet based on the identification result, queues that non-MFH packet. The MFH packets are high-priority packets, whereas the non-MFH packets are low-priority packets. Hence, as a result of outputting the MFH packets on a priority basis, the competition with the non-MFH packets can be avoided and thus the output delay of the MFH packets can be held down. The first gate 22A opens and closes the output of the MFH packets in the first queue 21A. The second gate 22B opens and closes the output of the non-MFH packets in the second queue 21B. The selector 23 selectively outputs the output from either the first gate 22A or the second gate 22B.

The collecting unit 24 collects statistical information of the arrived packets. The statistical information contains the number of arrived packets in each time slot. Herein, the number of arrived packets is not limited to the number of packets, and alternatively can represent the number of bytes in those packets. The analyzing unit 25 analyzes the statistical information indicating the number of arrived packets, and identifies the cyclic pattern indicating the cyclic nature and the pattern of the arrived packets. Then, the analyzing unit 25 learns about the arrival interval (cyclic nature) and the pattern (the average arrival volume and the degree of fluctuation of the burst). Based on the analysis result obtained by the analyzing unit 25, the control unit 27 updates the content of the list table 26. Based on the cyclic pattern of the arrived packets, the control unit 27 updates the time slot numbers and the holding period corresponding to each TS number in the list table 26. A time slot is equivalent to the unit time for which the open state or the closed state of the gate is maintained and, for example, represents the time interval obtained by compartmentalizing the time into a certain period of time (cyclic pattern) and dividing the certain period of time into the unit time for switching between the opening and closing of the gate. The time interval of each time slot is defined by the holding period specified in the list table 26 (described later) illustrated in FIG. 4, and each time interval can be set to have a different value. Moreover, based on the cyclic pattern, the control unit 27 updates the setting state of the first gate 22A and the second gate 22B corresponding to each TS number in the list table 26. Based on the number of arrived MFH packets from among the reception packets, the control unit 27 estimates the arrival timings of the MFH packets that represent high-priority packets. Herein, the setting state indicates open-closed information indicating the opening and the closing of the first gate 22A and the second gate 22B. Since the MFH packets are high-priority packets and the non-MFH packets are low-priority packets, the control unit 27 keeps the first gate 22A open all the time and switches the second gate 22B between the open state and the closed state in units of time slot. In the open state of the first gate 22A, the MFH packets held in the first queue 21A are output. In the open state of the second gate 22B, the non-MFH packets held in the second queue 21B are output; and, in the closed state of the second gate 22B, the output of the non-MFH packets held in the second queue 21B is suspended and the MFH packets held in the first queue 21A are output.

FIG. 4 is an explanatory diagram of an example of the list table 26. The list table 26 illustrated in FIG. 4 is used to manage the following items in a corresponding manner: TS number 26A; setting state 26B of the first gate 22A; setting state 26C of the second gate 22B; and holding period 26D. The TS number 26A represents a number for enabling identification of the time slot of a reception packet. The setting state 26B of the first gate 22A represents gate opening-closing information indicating the open (O) state or the closed (C) state of the first gate 22A. The setting state 26C of the second gate 22B represents gate opening-closing information indicating the open (O) state or the closed (C) state of the second gate 22B. The holding period 26D represents the assignment period for each TS number 26A. The TS number 26A can be appropriately varied in the range from 0 to N. In the example illustrated in FIG. 4, N=14 is set. The setting state 26B of the first gate 22A and the setting state 26C of the second gate 22B can be appropriately varied for each TS number 26A. Moreover, the holding period 26D too can be appropriately varied for each TS number 26A. The control unit 27 refers to the list table 26 and, at the timing of the TS number "0", sets the setting state corresponding to the TS number "0" in the first gate 22A and the second gate 22B. Then, at the timing of the TS number "1", the control unit 27 sets the setting state corresponding to the TS number "1" in the first gate 22A and the second gate 22B. Similarly, at the timing of each of the TS numbers "2" to "N", the control unit 27 sequentially sets the setting state corresponding to the concerned TS number in the first gate 22A and the second gate 22B. After the setting state corresponding to the TS number "N" is set, the system control returns to the TS number "0" and the control unit 27 sets the setting state corresponding to the TS number "0" and then, at the timing of each of the TS numbers "1" to "N", sequentially sets the setting state corresponding to the concerned TS number in the first gate 22A and the second gate 22B. That is, the control unit 27 refers to the list table 26 and, at the timing of each of the TS numbers "0" to "N", sequentially sets the setting state corresponding to the concerned TS number in the first gate 22A and the second gate 22B in a cyclic and repeated manner.

Figure 5:
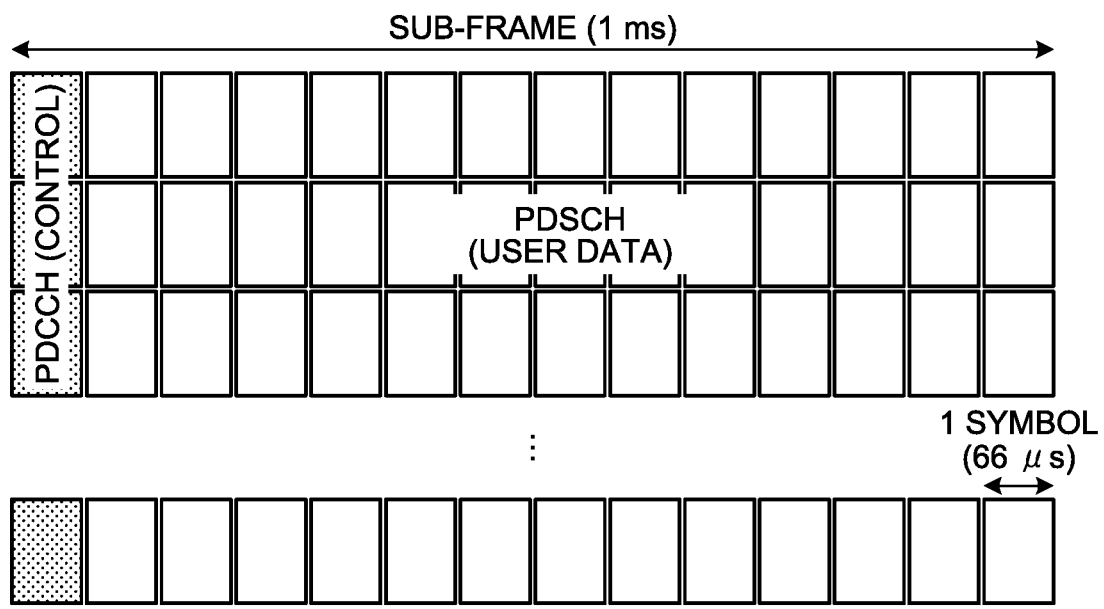
FIG. 5 is an explanatory diagram illustrating an exemplary signal configuration of wireless signals.

FIG. 5 is an explanatory diagram illustrating an exemplary signal configuration of wireless signals. For example, a wireless signal illustrated in FIG. 5 is made of 1-millisecond sub-frames and includes a physical downlink control channel (PDCCH) and a physical downlink shared channel (PDSCH). The PDCCH represents the area for storing control information that, for example, contains the bandwidth reservation amount. The PDSCH represents the area for storing user data. The bandwidth reservation amount represents, for example, the information indicating the volume of assignment of user data to the resource block (RB) in the PDSCH.

Figure 6:
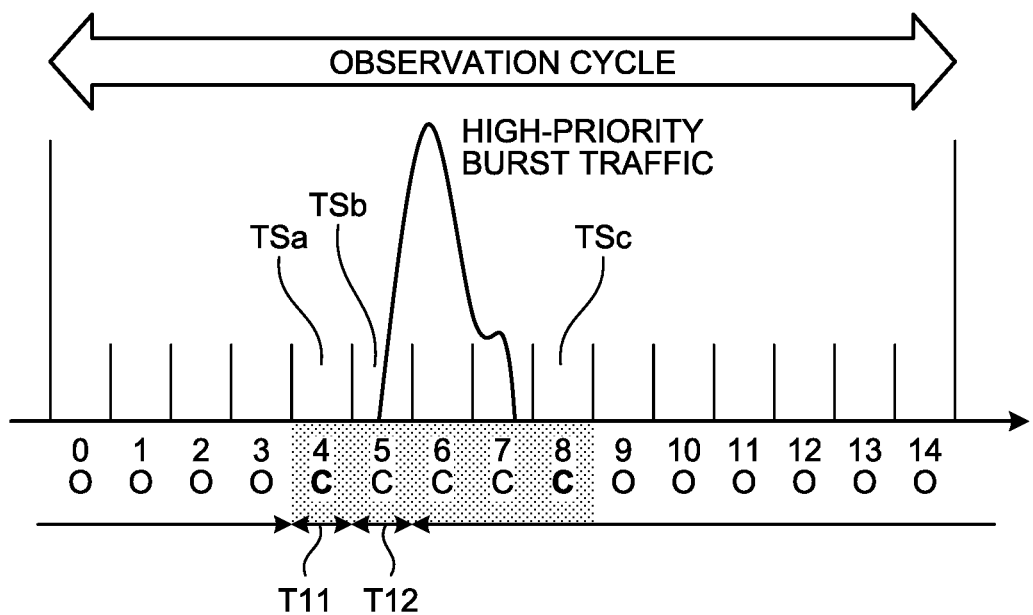
FIG. 6 is an explanatory diagram illustrating an exemplary observation cycle in the normal condition.

FIG. 6 is an explanatory diagram illustrating an exemplary observation cycle in the normal condition. The vertical axis represents the number of arrived packets, and the horizontal axis represents the time axis. The analyzing unit 25 refers to the number of packets in each time slot in the observation cycle, and identifies the cycle pattern of burst sections having the TS numbers "5", "6", and "7". A burst section includes data, that is, indicates a section having a positive number of arrived packets. The analyzing unit 25 identifies the cyclic pattern from the arrived packets and, when the cyclic pattern is identified in succession for a predetermined number of times, determines that the cyclic pattern is of MFH packets. When the cyclic pattern is determined to be of MFH packets, the analyzing unit 25 identifies the burst sections of the cyclic pattern. A burst section includes data, that is, indicates a time slot section having a positive number of arrived packets. Then, the analyzing unit 25 identifies the burst sections of the identified cyclic pattern, and identifies a margin section equivalent to a single time slot before the burst sections and a single time slot after the burst sections. Regarding each TS number in the burst sections and the margin sections, the control unit 27 sets the second gate 22B to the closed state. In the case of the cyclic pattern illustrated in FIG. 6, the analyzing unit 25 identifies, for example, the burst sections having the TS numbers "5", "6", and "7". For example, when the cyclic pattern including the burst sections having the TS numbers "5", "6", and "7" is identified, the analyzing unit 25 identifies the sections having the TS numbers "5", "6", and "7" as the burst sections. Moreover, the analyzing unit 25 identifies, as the margin sections, the section having the TS number "4", which is present one time slot before the burst section having the TS number "5", and the section having the TS number "8", which is present one time slot after the burst section having the TS number "7". Then, the control unit 27 updates the content of the list table 26 with the aim of setting the second gate 22B of the burst sections and the margin sections, that is, the sections having the TS numbers "4" to "8" to the closed state. Meanwhile, since the packet switches 7 have a free-running clock, there are times when a mismatch occurs in the clock deviation with respect to the other packet switches 7, the BBUs 6, and the RRHs 5.

In the observation cycle illustrated in FIG. 6, for the purpose of illustration, the burst sections and the margin sections in which the second gate 22B is set to the closed state are treated as a closed section, and the sections in which the second gate 22B is set to the open state are treated as an open section. In the closed section, the initial time slot of the closed section is referred to as a closed starting point TSa, the initial time slot of the burst sections in the closed section is referred to as a burst starting point TSb, and the last time slot of the closed section is referred to as a closed end point TSc. In the normal condition, the expected value of the closed starting point TSa becomes "0", the expected value of the burst starting point TSb becomes "positive", and the expected value of the closed end point TSc becomes "positive".

Figure 7A:
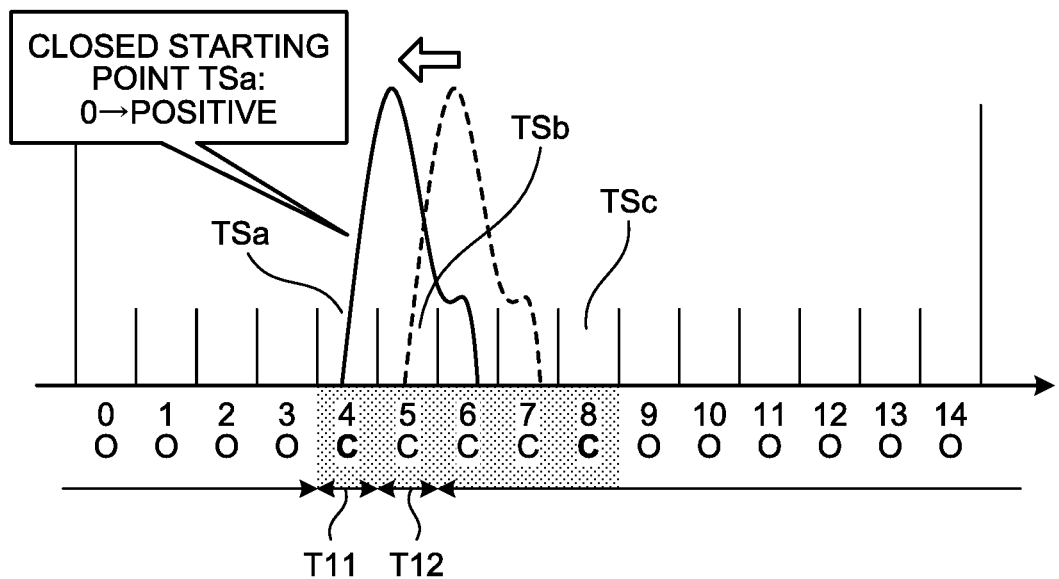
FIG. 7A is an explanatory diagram illustrating an example of the observation cycle in the case of occurrence of forward mismatch.

FIG. 7A is an explanatory diagram illustrating an example of the observation cycle in the case of occurrence of forward mismatch. Based on the number of packets in each time slot in the observation cycle, when the number of arrived packets at the closed starting point TSa in the observation cycle changes from "0" to "positive", the analyzing unit 25 determines that forward mismatch has occurred in the observation cycle.

Figure 7B:
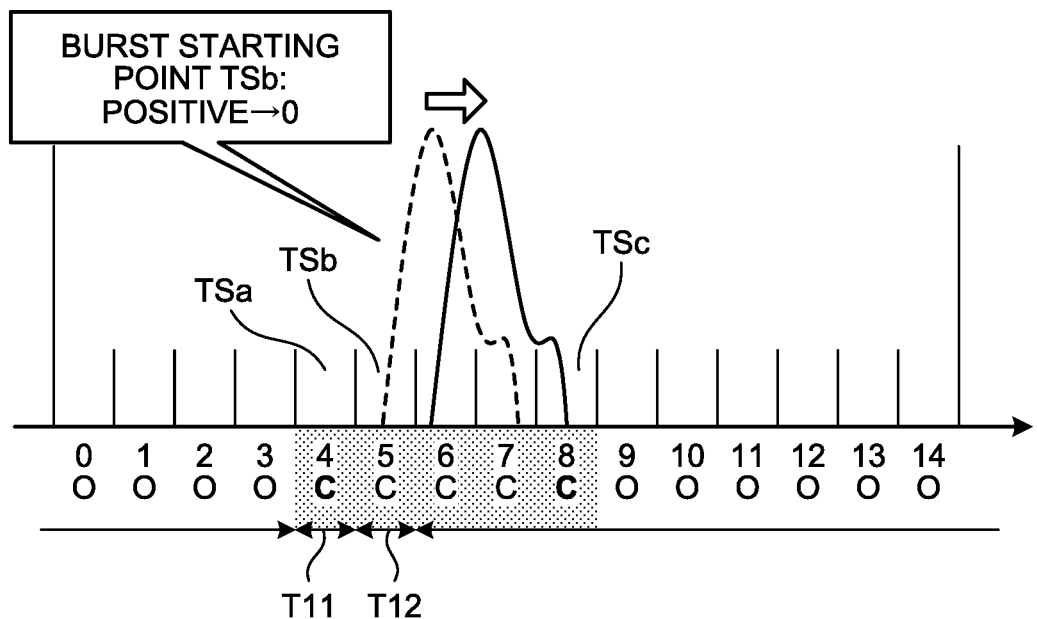
FIG. 7B is an explanatory diagram illustrating an example of the observation cycle in the case of occurrence of backward mismatch.

FIG. 7B is an explanatory diagram illustrating an example of the observation cycle in the case of occurrence of backward mismatch. Based on the number of packets in each time slot in the observation cycle, when the number of arrived packets at the burst starting point TSb in the observation cycle changes from "positive" to "0", the analyzing unit 25 determines that backward mismatch has occurred in the observation cycle.

The analyzing unit 25 identifies, in succession for a predetermined number of times, the cycle pattern of the burst sections having the TS numbers "4", "5", and "6" as illustrated in FIG. 7A, and determines that forward mismatch has occurred in the observation cycle. FIG. 8 is an explanatory diagram illustrating an example of the list table 26 after the correction against forward mismatch is performed. In the case of the cyclic pattern illustrated in FIG. 7A, the analyzing unit 25 identifies, for example, the burst sections having the TS numbers "4", "5", and "6". For example, when it is determined that the cyclic pattern is of the burst sections having the TS numbers "4", "5", and "6"; the analyzing unit 25 identifies the burst sections having the TS numbers "4", "5", and "6". The analyzing unit 25 identifies, as the margin sections, the section having the TS number "3", which is present one time slot before the burst section having the TS number "4", and the section having the TS number "7", which is present one time slot after the burst section having the TS number "6". Then, the control unit 27 updates the content of the list table 26 with the aim of setting the setting state of the second gate 22B corresponding to the burst sections and the margin sections, that is, corresponding to the sections having the TS numbers "3" to "7" to the closed state. In the case of updating the list table 26 illustrated in FIG. 4 to the list table illustrated in FIG. 8, the control unit 27 holds down, to the minimum, the updating of the setting state 26C of the second gate 22B corresponding to the TS numbers "4" to "8" to the setting state 26C of the second gate 22B corresponding to the TS numbers "3" to "7". Then, while maintaining the closed state of the second gate 22B corresponding to the TS numbers "4" to "7", the control unit 27 sets the section having the TS number "3" to the closed state and sets the section having the TS number "8" to the open state.

Figure 9:
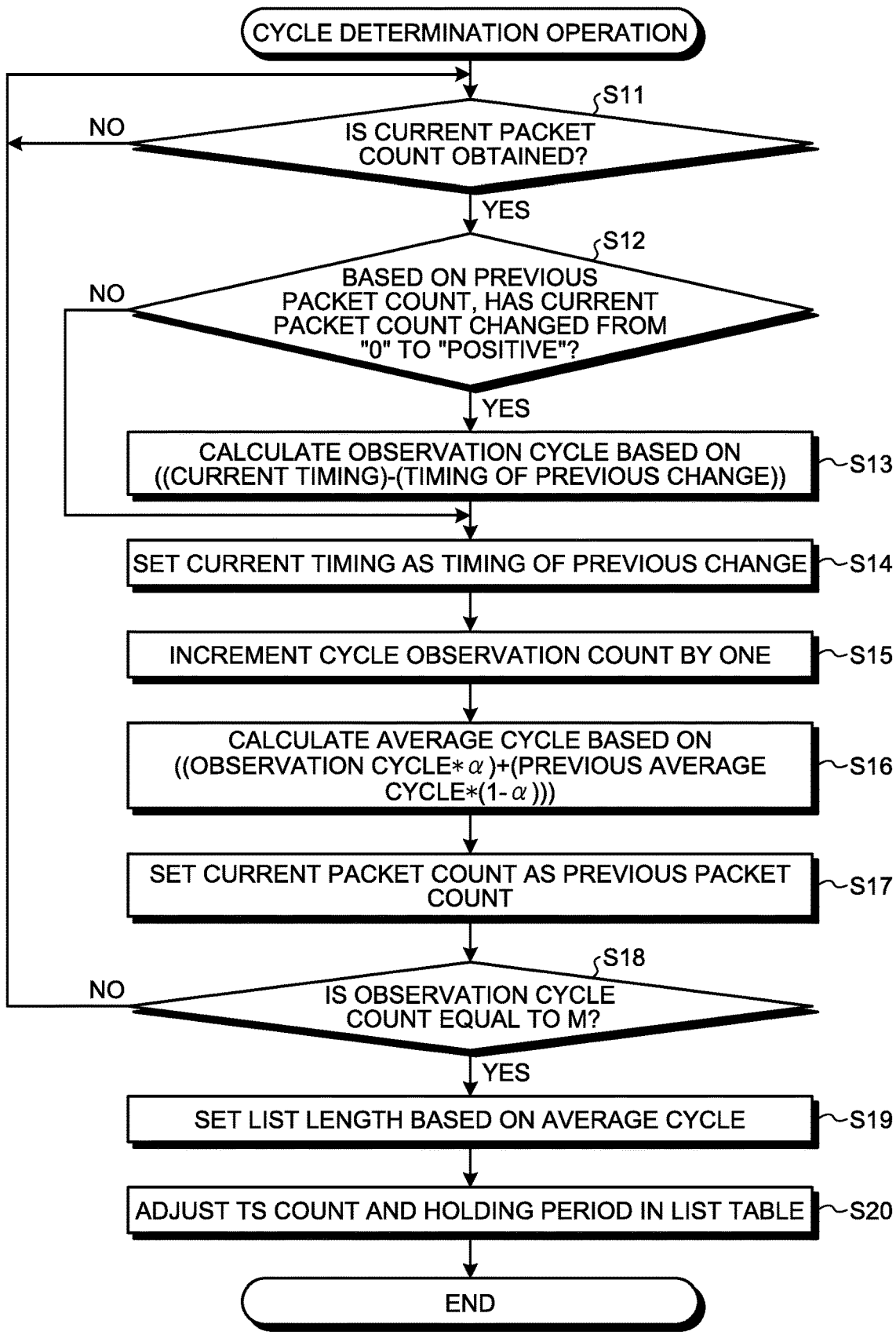
FIG. 9 is flowchart for explaining an example of the operations performed in the packet processing unit in regard to a cycle determination operation.

FIG. 9 is flowchart for explaining an example of the operations performed in the packet processing unit 12 in regard to a cycle determination operation. With reference to FIG. 9, the collecting unit 24 of the packet processing unit 12 determines whether or not the number of arrived packets in the current time slot is obtained (Step S11). When the number of arrived packets in the current time slot is obtained (Yes at Step S11), the analyzing unit 25 of the packet processing unit 12 determines, based on the number of arrived packets in the previous time slot, whether or not the current number of arrived packets has changed from "0" to "positive" (Step S12).

If the number of arrived packets in the current time slot has changed from "0" to "positive" (Yes at Step S12), then the analyzing unit 25 determines that the starting point of the burst sections in the arrived packets has arrived and calculates the observation cycle based on ((the current timing)−(the timing of the previous change)) (Step S13). Herein, the observation cycle represents the cyclic pattern of the occurrence of MFH packets.

Then, the analyzing unit 25 sets the current timing as the timing of the previous change (Step S14) and increments the cycle observation count by one (Step S15). Subsequently, the analyzing unit 25 calculates the average cycle based on the ((the observation cycle*$\alpha$)+(the previous average cycle* (1−$\alpha$))) (Step S16). Herein, $\alpha$ represents a coefficient satisfying 0<$\alpha$<1.

The analyzing unit 25 sets, as the number of arrived packets in the previous time slot, the number of arrived packets in the current time slot as obtained at Step S11 (Step S17), and determines whether or not the cycle observation count is equal to a count M (Step S18). Herein, the count M represents the threshold value of the cycle observation count. If the cycle observation count is equal to the count M (Yes at Step S18), then the control unit 27 of the packet processing unit 12 sets the list length of the list table 26 based on the average cycle (Step S19). Then, based on the average cycle, the control unit 27 adjusts the TS count (TS numbers) and the holding period in the list table (Step S20), and ends the operations illustrated in FIG. 9.

Meanwhile, if the number of arrived packets in the current time slot is not yet obtained (No at Step S11) or if the cycle observation count is not yet equal to the count M (No at Step S18), then the system control returns to Step S11 in order to determine whether or not the number of arrived packets in the current time slot is obtained. Moreover, if the number of arrived packets in the current time slot has not changed from "0" to "positive" (No at Step S12), then the system control returns to Step S14 so that the analyzing unit 25 can set the current timing to the timing of the previous change.

Based on the number of arrived packets in the previous time slot, when the number of arrived packets in the current time slot has changed from "0" to "positive", the analyzing unit 25 that performs the cycle determination operation calculates ((the current timing)−(the timing of the previous change)) and increments the cycle observation count by one. The analyzing unit 25 calculates the average cycle based on ((the observation cycle*α)+(the previous average cycle*(1−α))). When the cycle observation count is equal to the count M, the control unit 27 adjusts the list length, the TS count, and the holding period in the list table 26 based on the average cycle. As a result, the control unit 27 can obtain the list length, the TS count (TS numbers), and the holding period in the list table 26 according to the arrived packets.

Figure 10:
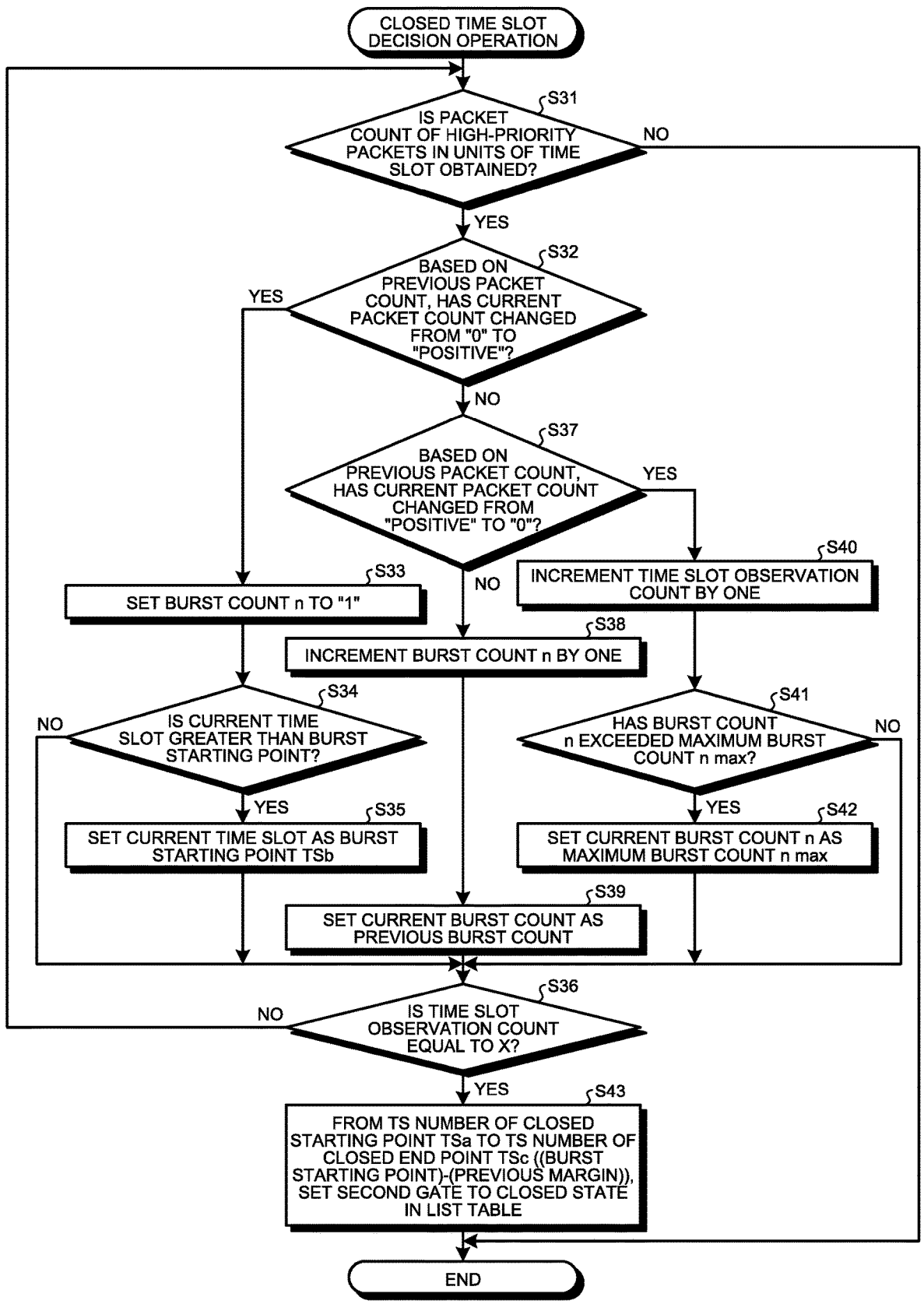
FIG. 10 is a flowchart for explaining an example of the operations performed in the packet processing unit in regard to a closed time slot decision operation.

FIG. 10 is a flowchart for explaining an example of the operations performed in the packet processing unit 12 in regard to a closed time slot decision operation. With reference to FIG. 10, the collecting unit 24 determines whether or not the number of arrived high-priority packets in units of time slot is obtained (Step S31). Herein, high-priority packets imply MFH packets. If the number of arrived high-priority packets is obtained (Yes at Step S31); then, based on the number of arrived packets in the previous time slot, the analyzing unit 25 determines whether or not the number of arrived packets in the current time slot has changed from "0" to "positive" (Step S32).

If the number of arrived packets in the current time slot has changed from "0" to "positive" (Yes at Step S32), then the control unit 27 determines that the starting point of the burst sections has arrived and sets the burst count to "1" (Step S33). Moreover, the control unit 27 determines whether or not the current time slot is greater than the burst starting point TSb (Step S34). Herein, the current time slot implies the time slot at the point of time when the number of arrived packets in the current time slot changes from "0" to "positive".

If the current time slot is greater than the currently-set burst starting point (Yes at Step S34), then the control unit 27 sets the current time slot as the burst starting point TSb (Step S35), and determines whether or not the time slot observation count is equal to a count X (Step S36). Herein, the count X represents the threshold value of the time slot observation count.

Meanwhile, if the number of arrived packets in the current time slot has not changed from "0" to "positive" (No at Step S32); then, based on the number of arrived packets in the previous time slot, the analyzing unit 25 determines whether or not the number of arrived packets in the current time slot has changed from "positive" to "0" (Step S37). If the number of arrived packets in the current time slot has not changed from "positive" to "0" (No at Step S37), then the control unit 27 determines that the burst sections are ongoing and increments the current burst count n by one (Step S38). Moreover, the control unit 27 sets the number of arrived packets in the current time slot as the number of packets in the previous time slot (Step S39), and the system control returns to Step S36 so that the control unit 27 can determine whether or not the time slot observation count is equal to the count X.

If the number of arrived packets in the current time slot has changed from "positive" to "0" (Yes at Step S37), then the control unit 27 determines that the end point of the burst sections has arrived and increments the time slot observation count by one (Step S40). Then, the control unit 27 determines whether or not the burst count n has exceeded the maximum burst count n max (Step S41). If the burst count n has exceeded the maximum burst count n max (Yes at Step S41), then the control unit 27 sets the current burst count n as the maximum burst count (Step S42), and the system control returns to Step S36 so that the control unit 27 can determine whether or not the time slot observation count is equal to the count X.

If the time slot observation count is equal to the count X (Yes at Step S36), then the control unit 27 sets the time slot sections from the section having the TS number ((the burst starting point)−(the previous margin)) to the section having the TS number ((the burst starting point)+(the maximum burst value)+(the subsequent margin)) as the closed section. Then, the control unit 27 changes the setting state of the second gate 22B corresponding to the closed section to the closed state (Step S43). Herein, the section having the TS number ((the burst starting point)−(the previous margin)) represents the closed starting point TSa that is the starting point of the closed section; and the section having the TS number ((the burst starting point)+(the maximum burst value)+(the subsequent margin)) represents the closed end point TSc that is the end point of the closed section. Subsequently, the control unit 27 ends the operations illustrated in FIG. 10. Herein, the previous margin as well as the subsequent margin is assumed to be equivalent to one time slot.

Meanwhile, if the number of arrived high-priority packets is not yet obtained (Yes at Step S31); then the collecting unit 24 ends the operations illustrated in FIG. 10. Moreover, if the current time slot is not greater than the burst starting point TSb (No at Step S34), then the system control proceeds to Step S36 so that the control unit 27 can determine whether or not the time slot observation count is equal to the count X. Furthermore, if the burst count n has not exceeded the maximum burst count n max (No at Step S41), then the system control returns to Step S36 so that the control unit 27 can determine whether or not the time slot observation count is equal to the count X. If the time slot observation count is not equal to the count X (No at Step S36), then the system control returns to Step S31 so that the control unit 27 can determine whether or not the number of arrived high-priority packets is obtained.

The control unit 27 that performs the closed time slot decision operation obtains the number of arrived high-priority packets and, based on the number of arrived packets in the previous time slot, sets the burst count n to "1" if the number of packets in the current time slot has changed from "0" to "positive", and sets the TS number of the current time slot as the TS number of the burst starting point. Moreover, based on the number of arrived packets in the previous time slot TS, if the number of packets in the current time slot has not changed from "positive" to "0", increments the burst count n by one. Furthermore, based on the number of arrived packets in the previous time slot, if the number of arrived packets in the current time slot has changed from "positive" to "0", then the control unit 27 increments the time slot observation count by one, and sets the current burst count as the maximum burst count.

If the time slot observation count is equal to the count X, then the control unit 27 sets the sections from the section having the TS number ((the burst starting point)−(the previous margin)) to the section having the TS number ((the burst starting point)+(the maximum burst value)+(the subsequent margin)) as the closed section for the second gate 22B. That is, since the first gate 22A is open all the time, the closed section for the second gate 22B represents a high-priority output section for outputting MFH packets.

Figure 11:
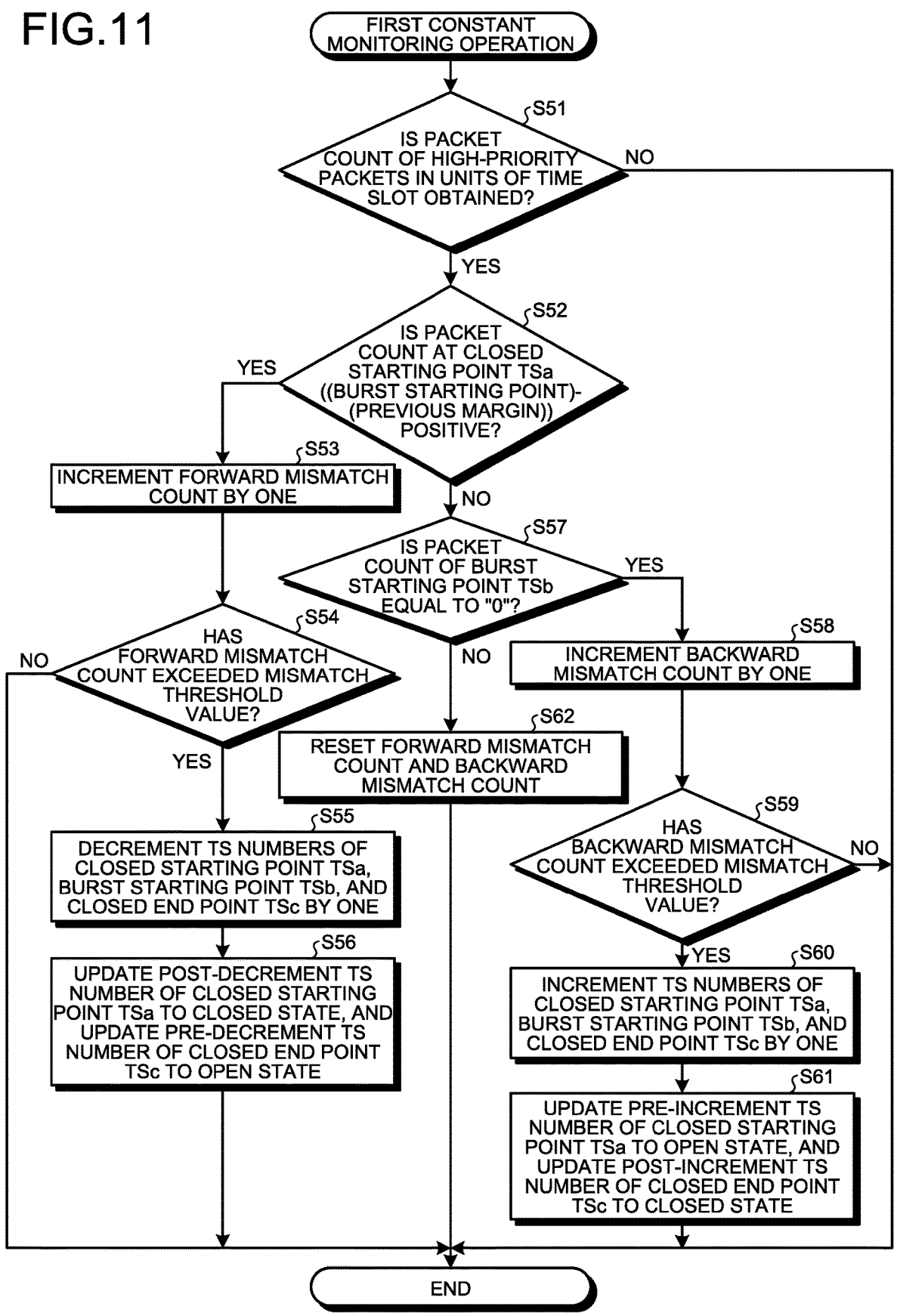
FIG. 11 is a flowchart for explaining an example of the operations performed in the packet processing unit in regard to a first constant monitoring operation.
Figure 24:
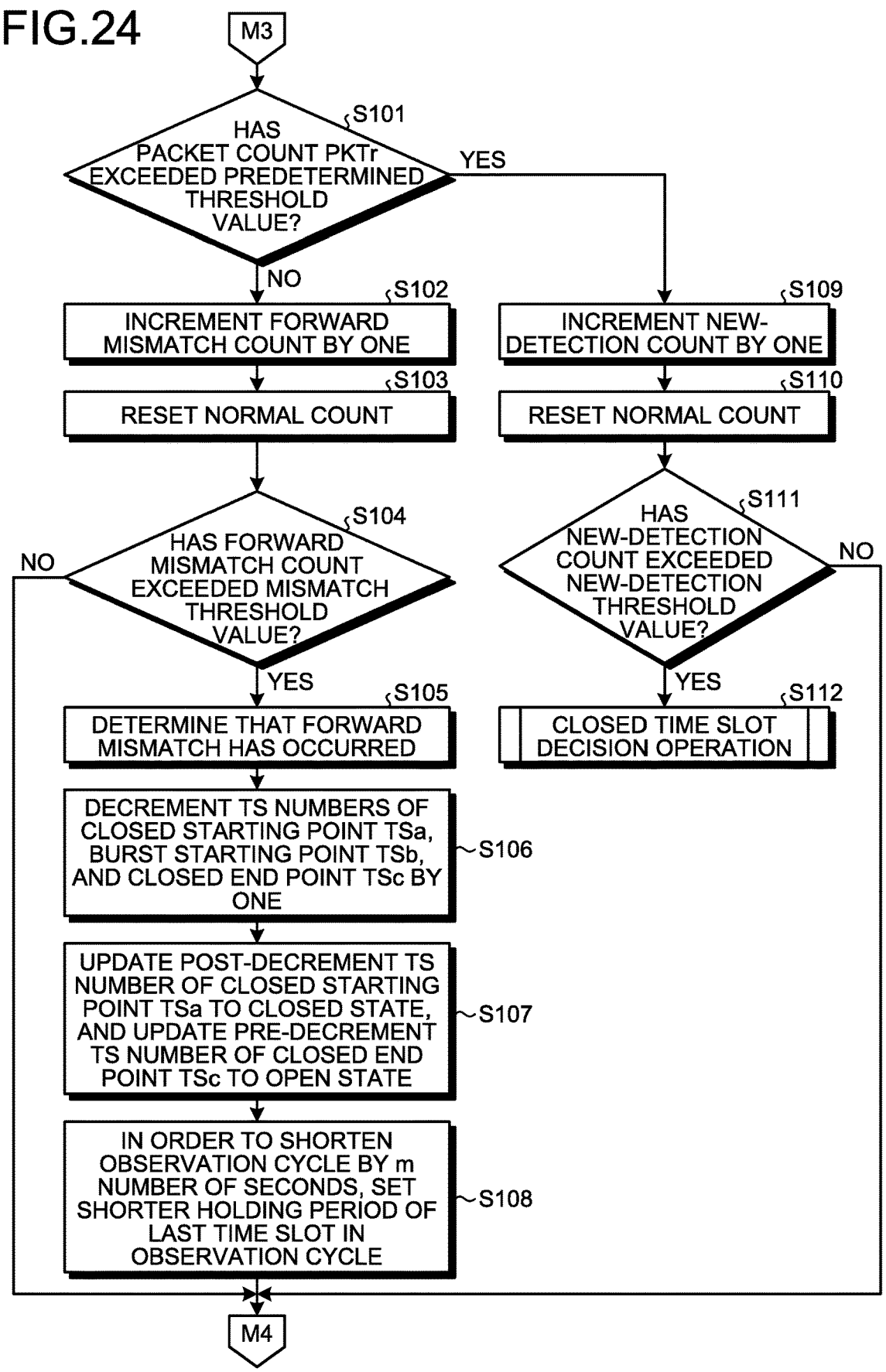

FIG. 11 is a flowchart for explaining an example of the operations performed in the packet processing unit 12 in regard to a first constant monitoring operation. With reference to FIG. 24, the collecting unit 24 determines whether or not the number of arrived high-priority packets (MFH packets) in units of time slot is obtained (Step S51). If the number of arrived high-priority packets is obtained (Yes at Step S51), then the analyzing unit 25 determines whether or not the number of arrived packets at the closed starting point TSa (i.e., (burst starting point)−(previous margin)) is positive (Step S52).

If the number of arrived packets at the closed starting point TSa is positive (Yes at Step S52); then, since the number of arrive packets at the closed starting point TSa is "0" in the normal condition, the analyzing unit 25 determines that forward mismatch has occurred and increments the forward mismatch count by one (Step S53). Then, the analyzing unit 25 determines whether or not the forward mismatch count has exceeded a mismatch threshold value (Step S54).

If the forward mismatch count has exceeded the forward mismatch count (Yes at Step S54), then the analyzing unit 25 decrements the TS numbers of the closed starting point TSa, the burst starting point TSb, and the closed end point TSc by one (Step S55). Moreover, the analyzing unit 25 updates the list table 26 so as to set, as the setting state of the second gate 22B, the post-decrement TS number of the closed starting point TSa to the closed state and the pre-decrement TS number of the closed end point TSc to the open state (Step S56). Then, the analyzing unit 25 ends the operations illustrated in FIG. 11.

Meanwhile, if the number of arrived packets at the closed starting point TSa is not positive (No at Step S52), then the analyzing unit 25 determines whether or not the number of arrived packets at the burst starting point TSb is "0" (Step S57). If the number of arrived packets at the burst starting point TSb is "0" (Yes at Step S57); then, since the number of arrived packets in the time slots is positive in the normal condition, the analyzing unit 25 determines that backward mismatch has occurred and increments a backward mismatch count by one (Step S58). Then, the analyzing unit 25 determines whether or not the backward mismatch count has exceeded the mismatch threshold value (Step S59).

If the backward mismatch count has exceeded the mismatch threshold value (Yes at Step S59), then the analyzing unit 25 increments the TS numbers of the closed starting point TSa, the burst starting point TSb, and the closed end point TSc by one (Step S60). Moreover, the control unit 27 updates the list table 26 so as to set, as the setting state of the second gate 22B, the pre-increment TS number of the closed starting point TSa to the open state and the post-increment TS number of the closed end point TSc to the closed state (Step S61). Then, the control unit 27 ends the operations illustrated in FIG. 11.

Meanwhile, if the number of arrived packets at the burst starting point TSb is not "0" (No at Step S57) then the analyzing unit 25 resets the forward mismatch count and the backward mismatch count (Step S62), and ends the operations illustrated in FIG. 11. Moreover, if the number of arrived high-priority packets (MFH packets) in units of time slot is not yet obtained (No at Step S51), then the collecting unit 24 ends the operations illustrated in FIG. 11. Furthermore, if the backward mismatch count has not exceeded the mismatch threshold value (No at Step S59) or if the forward mismatch count has not exceeded the mismatch threshold value (No at Step S54), then the analyzing unit 25 ends the operations illustrated in FIG. 11.

The analyzing unit 25 obtains the number of arrived MFH packets and, if ((the burst starting point)−(the previous margin)) is positive, that is, if the number of arrived packets at the closed starting point TSa is positive, increments the forward mismatch count by one because the number of packets in the normal condition is "0". If the forward mismatch count has exceeded the mismatch threshold value, then the analyzing unit 25 increments the TS numbers of the closed starting point TSa, the burst starting point TSb, and the closed end point TSc by one. Moreover, the control unit 27 sets, as the setting state of the second gate 22B, the TS number of the post-decrement closed starting point TSa to the closed state and the TS number of the pre-decrement closed end point TSc to the open state. As a result, even if the MFH packets move by one time slot in the forward direction, the closed section for the second gate 22B is moved by one time slot in the forward direction.

The analyzing unit 25 obtains the number of arrived MFH packets and, if the number of arrived packets at the burst starting point TSb is "0", increments the backward mismatch count by one because the number of arrived packets is positive in the normal condition. If the backward mismatch count has exceeded the mismatch threshold value, then the analyzing unit 25 increments the TS numbers of the closed starting point TSa, the burst starting point TSb, and the closed end point TSc by one. The control unit 27 sets, as the setting state of the second gate 22B, the pre-increment TS number of the closed starting point TSa to the open state and sets the post-increment TS number of the closed end point TSc to the closed state. As a result, even if the MFH packets move by one time slot in the backward direction, the closed section for the second gate 22B is moved by one time slot in the backward direction.

The packet processing unit 12 refers to the number of arrived MFH packets that arrive during the cycle determination operation, and obtains the TS count and the holding period of the observation cycle. Moreover, during the closed time slot decision operation, the packet processing unit 12 refers to the number of arrived MFH packets in each time slot within the observation cycle, identifies the cyclic pattern (the burst sections) of the MFH packets within the observation cycle, and decides on the closed section (priority section) of the second gate 22B. The packet processing unit 12 performs the cyclic determination operation and the closed time slot decision operation before the start of system operations; sets the observation cycle and the closed section as obtained as a result of performing the cyclic determination operation and the closed time slot decision operation; starts the system operations; and performs the first constant monitoring operation for correcting minor cycle errors in the observation cycle during the system operations.

Figure 12:
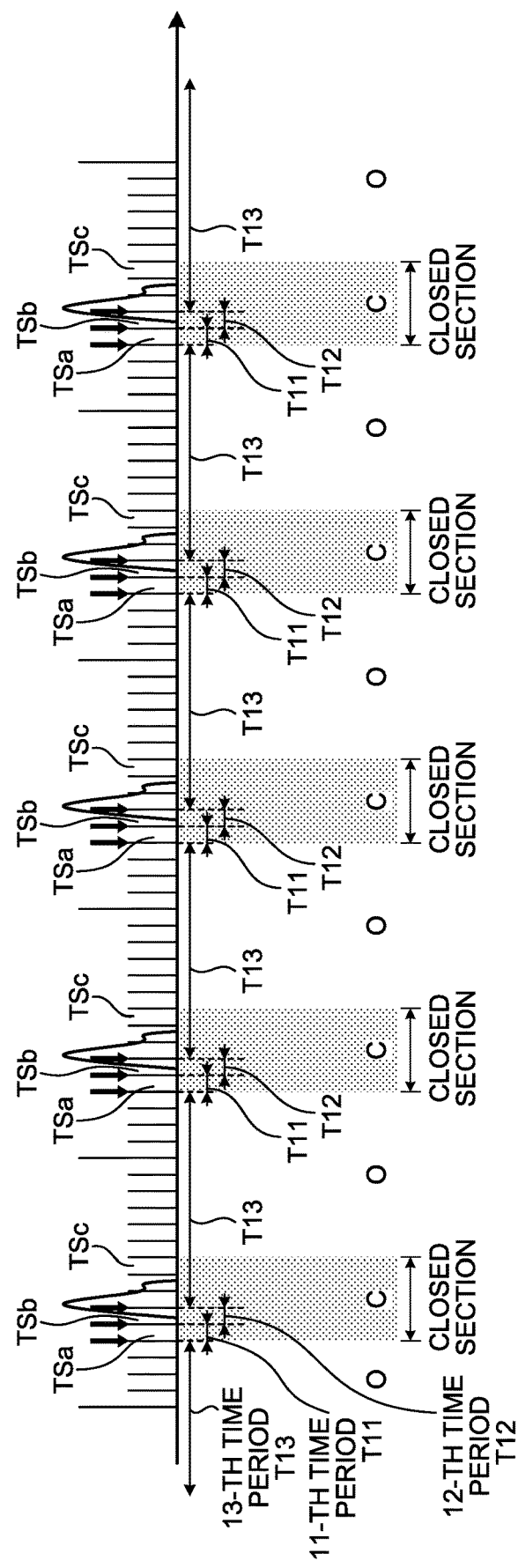
FIG. 12 is an explanatory diagram illustrating an example of the issue of information collection timing in each time slot in the observation cycle in regard to the first constant monitoring operation.

FIG. 12 is an explanatory diagram illustrating an example of the issue of information collection timing in each time slot in the observation cycle in regard to the first constant monitoring operation. The observation cycle occurring in succession includes an 11-th time period T11 for collecting information that is to be used in the forward mismatch determination; a 12-th time period T12 for collecting information that is to be used in the backward mismatch determination; and a 13-th time period T13 for monitoring the open state. The 11-th time period T11 is a section equivalent to one time slot from the start of the closed starting point TSa to the end thereof in the closed section. The 12-th time period T12 is a section equivalent to one time slot from the start of the burst starting point TSb to the end thereof in the closed section. The 13-th time period T13 is a section starting immediately after the burst starting point TSb till immediately before the closed starting point TSa.

During the first constant monitoring operation, in the closed section within the observation cycle, the start timings of the 11-th time period T11, the 12-th time period T12, and the 13-th time period T13 are close to each other as illustrated in FIG. 12. That results in a large processing load on the packet processing unit 12 and the CPU 15. Particularly, since the information collection interval is in units of time slot, there is a high average load and a high momentary load on the software. Besides, since the first constant monitoring operation is performed during the system operations, there is a higher processing load as compared to the cycle determination operation and the closed time slot decision operation performed before the start of system operations.

Figure 13:
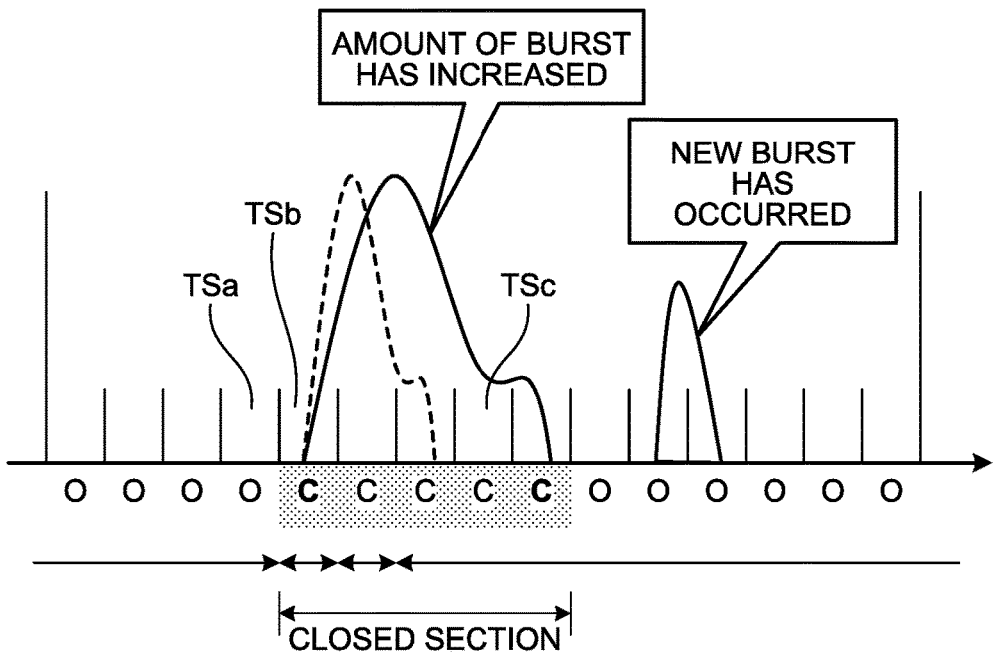
FIG. 13 is an explanatory diagram illustrating an example of the issues faced during the first constant monitoring operation.

FIG. 13 is an explanatory diagram illustrating an example of the issues faced during the first constant monitoring operation. In the observation cycle illustrated in FIG. 13, apart from the burst sections set during the first constant monitoring operation, there are times when a new burst occurs or there is a fluctuation in the burst section. However, the packet processing unit 12 that performs the first constant monitoring operation is not able to detect the fluctuation in the cyclic pattern such as the fluctuation in the burst sections within the observation cycle or the occurrence of new bursts.

In that regard, there is a demand for a method by which the packet processing unit 12 can correct the cyclic mismatch occurring in the observation cycle and detect the fluctuation in the cyclic pattern, while reducing the processing load during the system operations. In that regard, a new functional configuration is added in the analyzing unit 25 as illustrated in FIG. 14.

Figure 14:
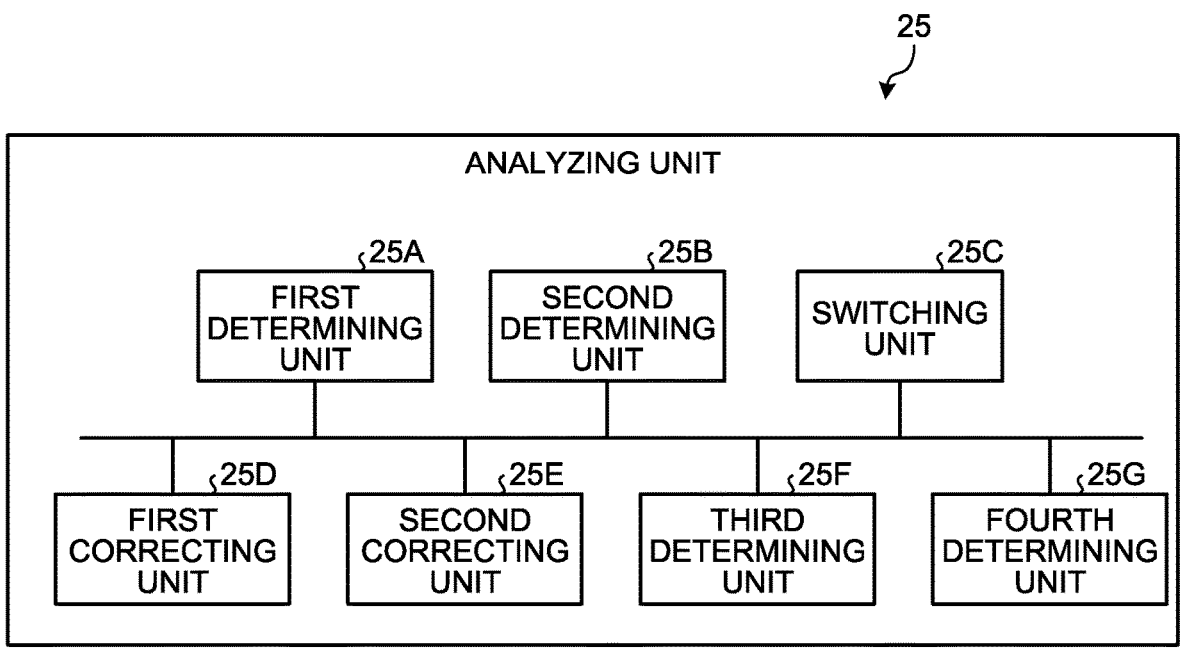
FIG. 14 is an explanatory diagram illustrating an exemplary functional configuration of an analyzing unit according to the embodiment.

FIG. 14 is an explanatory diagram illustrating an exemplary functional configuration of the analyzing unit 25 according to the embodiment. As illustrated in FIG. 14, the analyzing unit 25 includes a first determining unit 25A, a second determining unit 25B, a switching unit 25C, a first correcting unit 25D, a second correcting unit 25E, a third determining unit 25F, and a fourth determining unit 25G. The first determining unit 25A counts the number of arrived packets within a first time period T1 (described later) in the observation cycle and, based on the counted number of arrived packets, determines the occurrence of forward mismatch in the observation cycle. The second determining unit 25B counts the number of arrived packets within a second time period T2 (described later) in the observation cycle and, based on the counted number of arrived packets, determines the occurrence of backward mismatch in the observation cycle. The switching unit 25C performs switching among the first time period T1, a third time period T3, the second time period T2, the third time period T3, and the first time period T1 in that order.

The first correcting unit 25D corrects a skipping section present between the first time period T1 and the second time period T2, in order to ensure that the interval between the first time period T1 and the second time period T2 is longer when the normal condition is maintained. The second correcting unit 25E corrects the holding period, which represents the interval of arbitrary time slots from among a plurality of time slots in the observation cycle, in order to ensure that the observation cycle is shortened when forward mismatch is detected and the observation cycle is extended when backward mismatch is detected. The third determining unit 25F determines, based on the amount of fluctuation in the number of arrived packets in the first time period T1, whether or not fluctuation has occurred in the traffic in the burst sections of the observation cycle during the system operations. The fourth determining unit 25G determines, based on the amount of fluctuation in the number of arrived packets within the third time period T3, whether or not new bursts have occurred in the observation cycle during the system operations.

Figure 15:
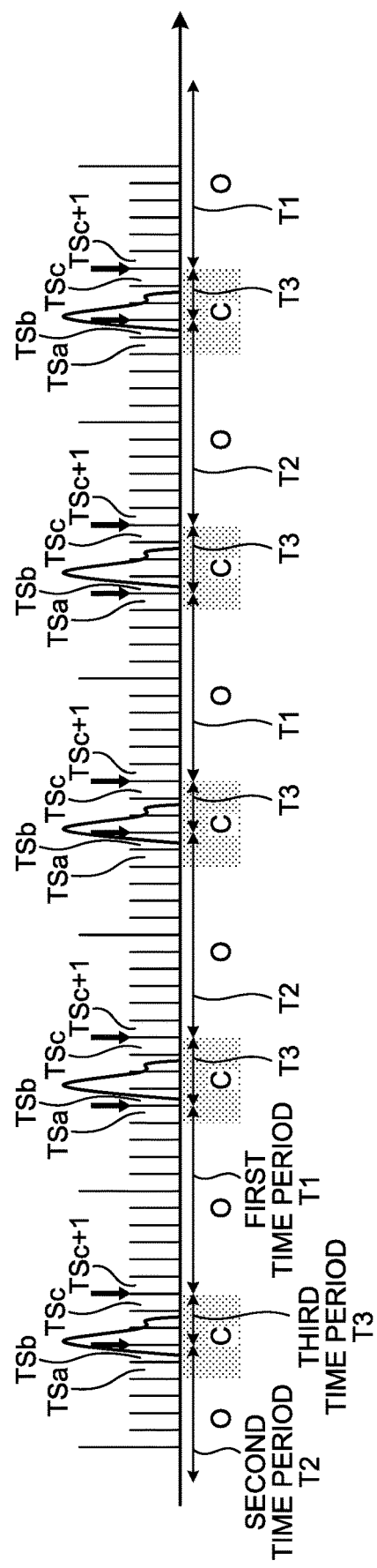
FIG. 15 is an explanatory diagram illustrating an example of the information collection timing in each time slot in the observation cycle according to the embodiment.

FIG. 15 is an explanatory diagram illustrating an example of the information collection timing in each time slot in the observation cycle in regard to a second constant monitoring operation according to the embodiment. The observation cycle occurring in succession includes the first time period T1 for collecting information that is to be used in the forward mismatch determination; the second time period T2 for collecting information that is to be used in the backward mismatch determination; and includes a third time period T3 for monitoring the open state. The first time period T1 is a section starting from a time slot TSc-1, which is present immediately after the closed section in the observation cycle, up to the end of the closed starting point TSa of the subsequently-arriving closed section. The second time period T2 is a section starting from the time slot TSc-1, which is present immediately after the closed section that is present immediately after the first time period T1, up to the burst starting point TSb of the burst section in the subsequently-arriving closed section. The third time period T3 corresponds to a skipping section and represents a section between the first time period T1 and the second time period T2.

Since the first time period T1 and the second time period T2 are alternately present for each skipping section, the number of times for which the information of the first time period T1 and the second time period T2 is collected can be reduced as compared to the first constant monitoring operation. As a result, the processing load on the packet processing unit 12 and the CPU 15 can be reduced to a large extent.

The first determining unit 25A counts the number of arrived packets in the first time period T1 and, based on the number of arrived packets counted in the first time period T1, determines the occurrence of forward mismatch in the observation cycle. The second determining unit 25B counts the number of arrived packets in the second time period T2 and, based on the number of arrived packets counted in the second time period T2, determines the occurrence of backward mismatch in the observation cycle. The switching unit 25C performs switching among the first time period T1, the third time period T3, the second time period T2, the third time period T3, and the first time period T1 in that order in a repeated manner.

Figure 16:
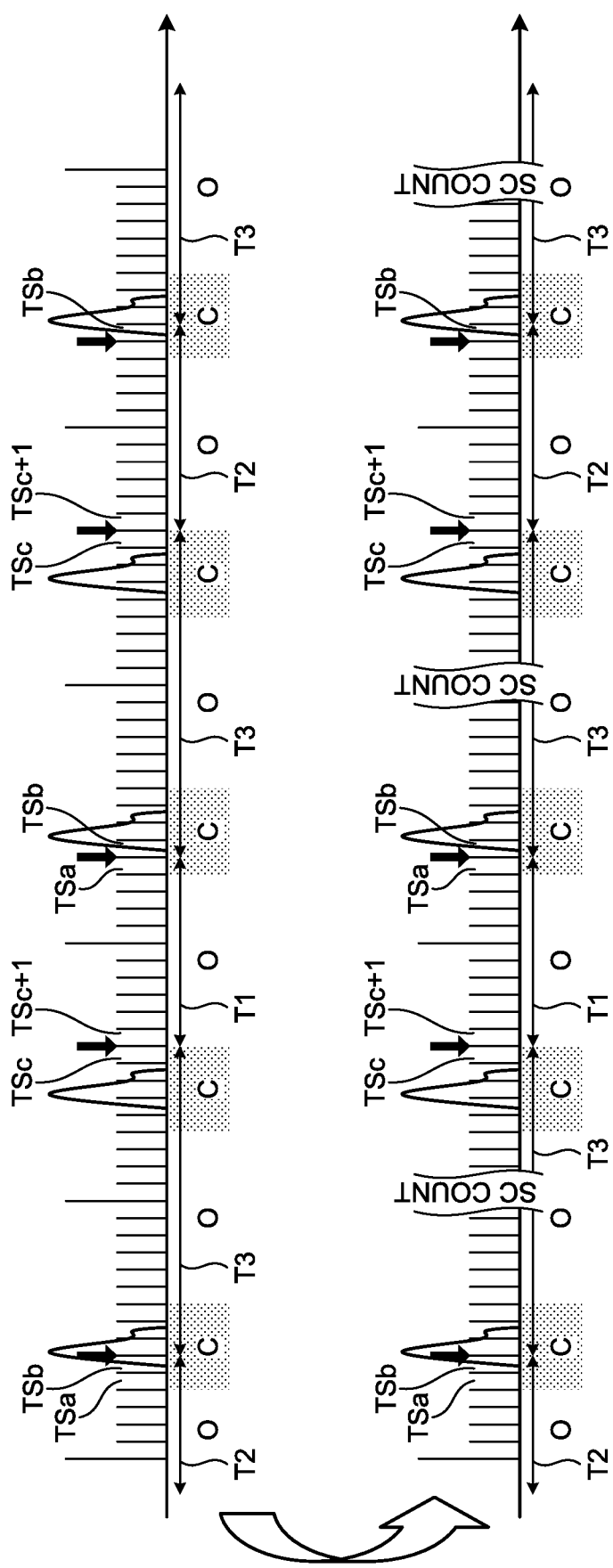
FIG. 16 is an explanatory diagram illustrating an example of the information collection timings after a first correcting unit has increased the section skipping within the observation cycle.

FIG. 16 is an explanatory diagram illustrating an example of the information collection timings after the first correcting unit 25D has increased the section skipping within the observation cycle. The first correcting unit 25D counts the normal count when the determination result of no forward mismatch is obtained in succession by the first determining unit 25A and the determination result of no backward mismatch is obtained in succession by the second determining unit 25B. If the normal count has exceeded a normal threshold value, then the first correcting unit 25D performs correction for increasing the section skipping count. For example, if there is no backward mismatch or forward mismatch during a specific period of time (N number of cycles) in which the normal condition is maintained, the section skipping count (an SC count) is increased. The skipping section is in units of time slot, and the section skipping count is converted using the units of time slot. That is, as illustrated in FIG. 16, although there is an increase in the sections in the third time period T3, the processing load can be reduced by reducing the information collection count in the first time period T1 and the second time period T2. For example, if there is no mismatch for 100 cycles in succession; then, for example, the section skipping count equal to twice the observation cycle is extended to the maximum while ensuring that the detection accuracy does not suffer.

As a result, the processing load can be reduced by reducing the information collection count in the first time period T1 and the second time period T2 while maintaining the detection accuracy.

If the forward mismatch count exceeds the mismatch threshold value, then the first determining unit 25A determines that forward mismatch has occurred in the observation cycle. When the first determining unit 25A determines the occurrence of forward mismatch, the second correcting unit 25E shortens the observation cycle, such as shortens the holding period of the last time slot in the observation cycle. FIG. 17 is an explanatory diagram illustrating an example of the list table 26 when the second correcting unit 25E performs forward mismatch correction. In the case of changing the observation cycle from 1216 microseconds to 1215 microseconds, the second correcting unit 25E corrects the holding period of the last time slot having the TS number "N" from 216 microseconds to 215 microseconds as illustrated in FIG. 17. Thus, as a result of minimizing the error by fine tuning the observation cycle, the correction count in the observation cycle can be lowered.

When the backward mismatch count exceeds the mismatch threshold, the second determining unit 25B determines that backward mismatch has occurred in the observation cycle. When the second determining unit 25B determines the occurrence of backward mismatch, the second correcting unit 25E extends the observation cycle, such as extends the holding period of the last time slot in the observation cycle. FIG. 18 is an explanatory diagram illustrating an example of the list table 26 when the second correcting unit 25E performs backward mismatch correction. In the case of changing the observation cycle from 1216 microseconds to 1217 microseconds, the second correcting unit 25E corrects the holding period of the last time slot having the TS number "N" from 216 microseconds to 217 microseconds as illustrated in FIG. 18. Thus, as a result of minimizing the error by fine tuning the observation cycle, the correction count in the observation cycle can be lowered.

Figure 19:
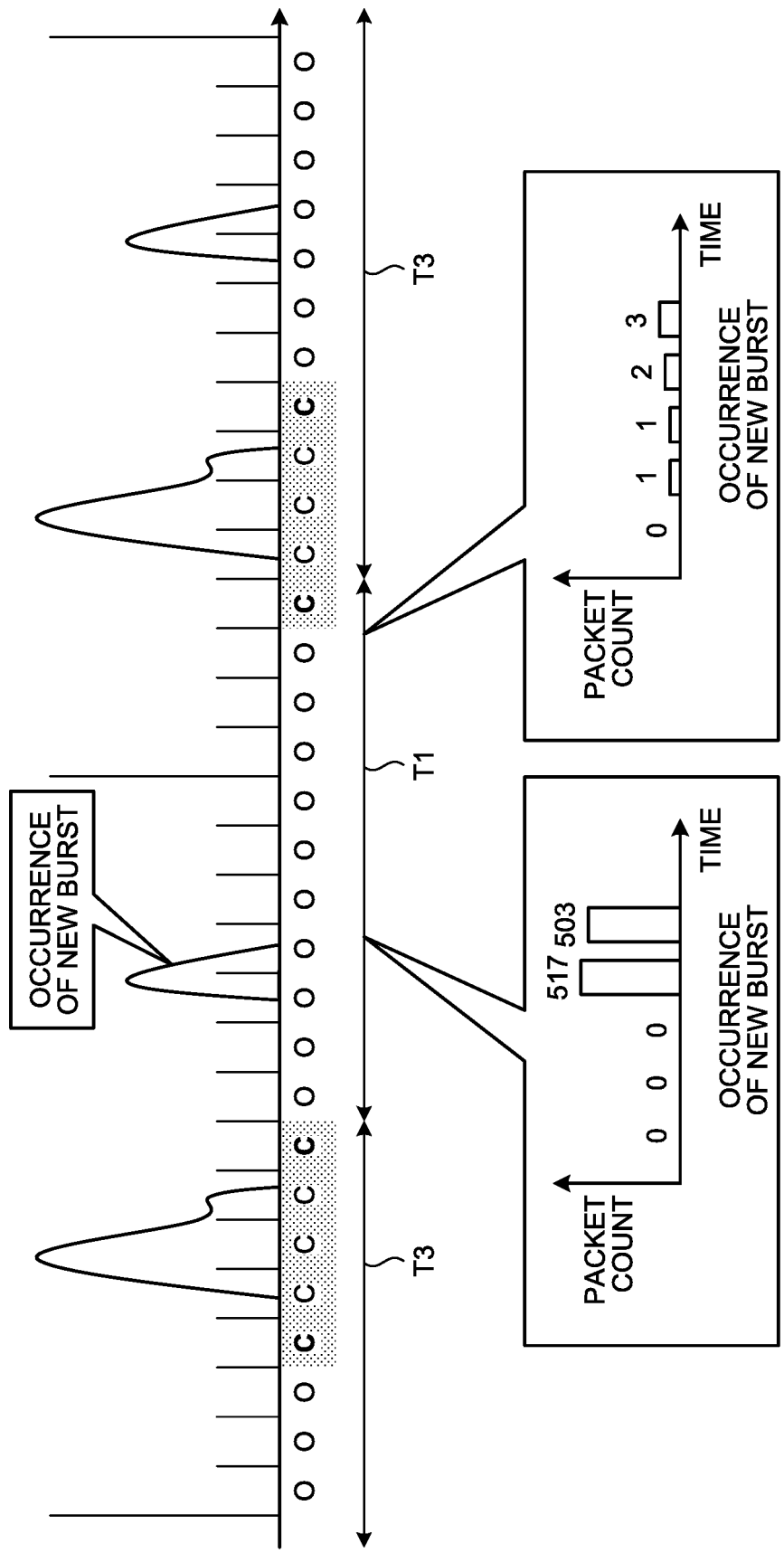
FIG. 19 is an explanatory diagram illustrating an example of the operations performed by a third determining unit.

FIG. 19 is an explanatory diagram illustrating an example of the operations performed by the third determining unit 25F. Herein, it is assumed that a new burst has occurred in the open section within the first time period T1 of the observation cycle. The third determining unit 25F determines whether or not the number of arrived packets in the first time period T1 has exceeded a first threshold value. If the number of arrived packets in the first time period T1 has exceeded the first threshold value, then the third determining unit 25F performs the closed time slot decision operation as illustrated in FIG. 10. As a result, in the observation cycle, the occurrence of a new burst can be detected from the open section. If the number of arrived packets increases exponentially as illustrated in FIG. 19, the third determining unit 25F determines that there is a possibility of occurrence of a new burst in the open section, and performs the closed time slot decision operation. On the other hand, if the number of arrived packets increases in a gradual manner but does not exceed the first threshold value as illustrated in FIG. 19, then the third determining unit 25F determines that a mismatch has occurred in the observation cycle.

Figure 20:
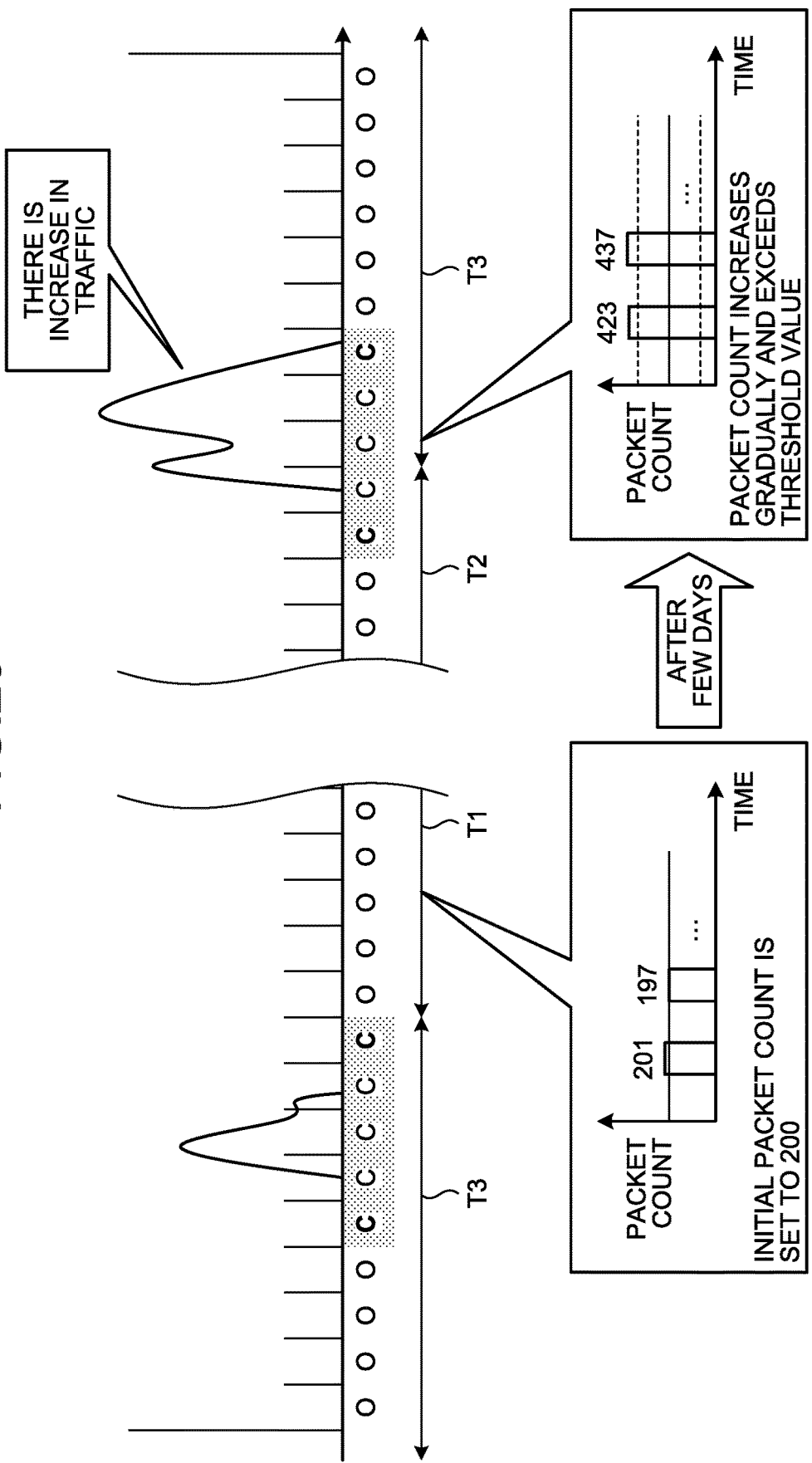
FIG. 20 is an explanatory diagram illustrating an example of the operations performed by a fourth determining unit.

FIG. 20 is an explanatory diagram illustrating an example of the operations performed by the fourth determining unit 25G. Herein, it is assumed that the number of arrived packets in the burst sections of the closed section in the observation cycle has increased in a gradual manner. The fourth determining unit 25G obtains the number of arrived packets in the third time period T3 and, if the number of packets is obtained for the first time, stores the number of packets as the initial number of packets. Moreover, the fourth determining unit 25G calculates the absolute value of (((the current number of arrived packets)/(the section skipping count (SC count))−(the number of initial packets)) as the amount of fluctuation. If the amount of fluctuation has exceeded a fluctuation threshold value, then the fourth determining unit 25G increments the fluctuation count by one. Then, if the fluctuation count has exceeded a fluctuation detection threshold value, the fourth determining unit 25G determines that the traffic in the burst sections of the observation cycle is highly likely to have fluctuated, and performs the closed time slot decision operation. The case in which the amount of fluctuation has exceeded the fluctuation threshold value implies that, as compared to the number of arrived packets counted for the first time in the third time period T3 (i.e., the initial number of packets) during the second constant monitoring operation, the number of arrived packets in the third time period T3 is substantially fluctuating up and down. As a result, during the system operations, the packet processing unit 12 can detect the fluctuation in the number of arrived packets in the burst sections of the observation cycle.

Figure 21:
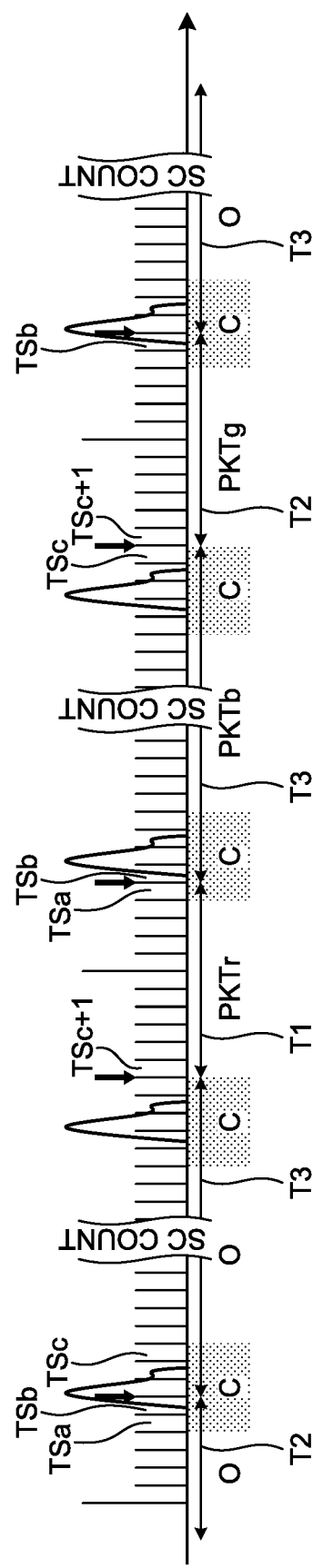
FIG. 21 is an explanatory diagram illustrating an example of the information collection timing in each time slot in the observation cycle according to the embodiment.

FIG. 21 is an explanatory diagram illustrating an example of the information collection timing in each time slot in the observation cycle according to the embodiment. In the observation cycle illustrated in FIG. 21, the switching is done among the first time period T1, the third time period T3, the second time period T2, the third time period T3, and the first time period T1 in that order. The first determining unit 25A obtains an arrived-packet count PKTr of all time slots in the first time period T1. The fourth determining unit 25G obtains an arrived-packet count PKTb of all time slots in the third time period T3. The second determining unit 25B obtains an arrived-packet count PKTg of all time slots in the second time period T2.

Figure 22:
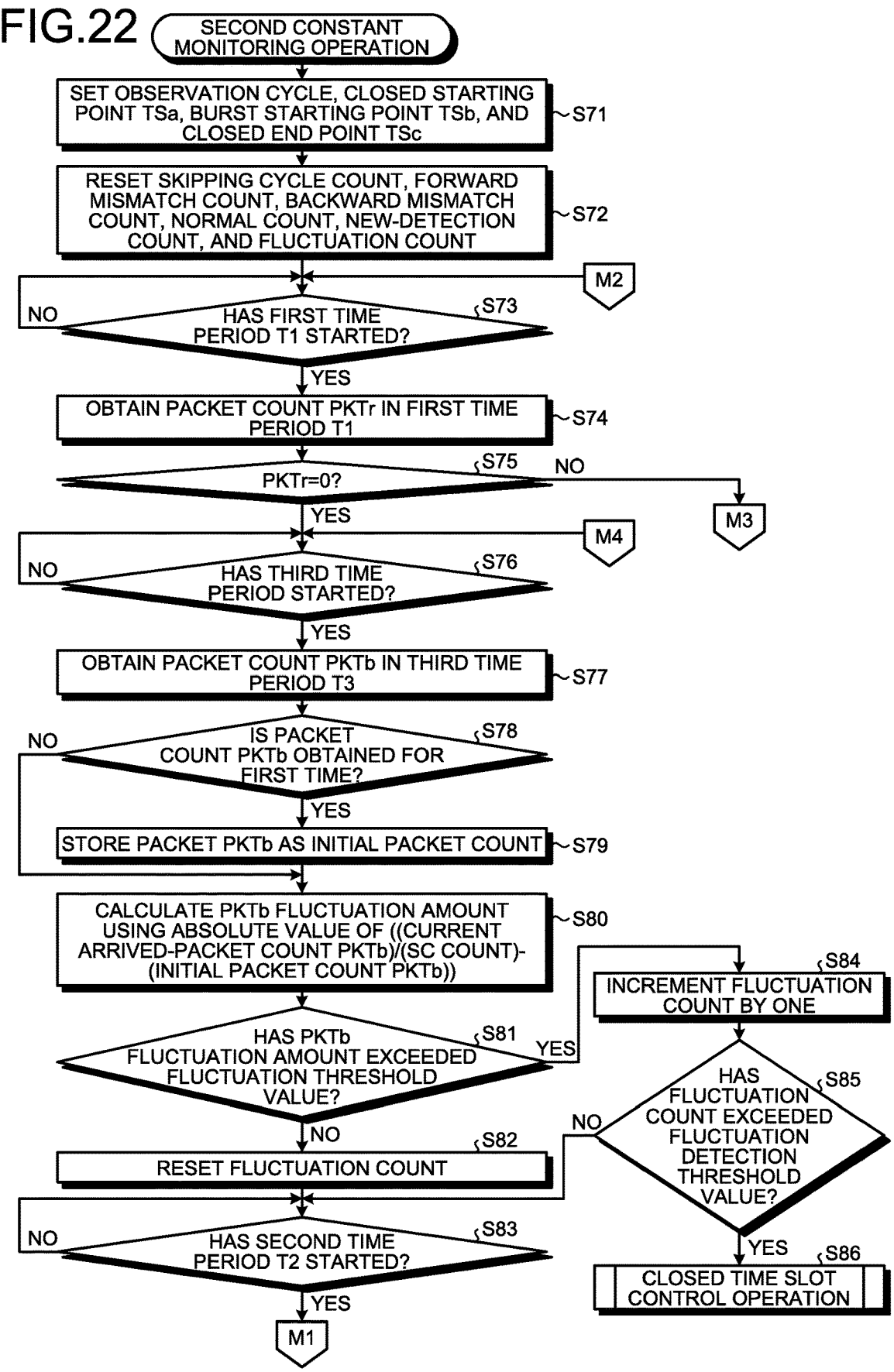
FIGS. 22 to 25 are flowcharts for explaining an example of the operations performed by the packet processing unit in regard to a second constant monitoring operation.

FIGS. 22 to 25 are flowcharts for explaining an example of the operations performed by the packet processing unit 12 in regard to the second constant monitoring operation. With reference to FIG. 22, the analyzing unit 25 sets the observation cycle, the closed starting point TSa, the burst starting point TSb, and the closed end point TSc (Step S71). The analyzing unit 25 resets the skipping cycle count, the forward mismatch count, the backward mismatch count, the normal count, the new-detection count, and the fluctuation count (Step S72). The first determining unit 25A of the analyzing unit 25 determines whether or not the first time period T1 has started (Step S73). Meanwhile, the first time period T1 is a section starting from the time slot TSc-1 of the previous observation cycle up to the end of the closed starting point TSa of the subsequently-arriving closed section.

If the first time period T1 has started (Yes at Step S73), then the first determining unit 25A sequentially counts the number of arrived packets in each time slot from the time slot TSc-1 in the first time period T1, and obtains the arrived-packet count PKTr of all time slots in the first time period T1 (Step S74). Then, the first determining unit 25A determines whether or not the arrived-packet count PKTr is "0" (Step S75). Herein, regarding the expected value of the arrived-packet count PKTr, the number of arrived packets from the time slot TSc-1 to the closed starting point TSa is "0". If the arrived-packet count PKTr is "0" (Yes at Step S75), then the first determining unit 25A determines that there is no forward mismatch in the observation cycle. The fourth determining unit 25G of the analyzing unit 25 determines that there is no forward mismatch in the observation cycle, and determines whether or not the third time period T3 has started (Step S76). The third period represents the skipping section equivalent to a predetermined observation cycle count from the time slot present immediately after the first time period T1 up to the time slot present immediately before the second time period T2, or represents the skipping section equivalent to a predetermined observation cycle count from the time slot present immediately after the second time period T2 up to the time slot of the first time period T1.

If the third time period T3 has started (Yes at Step S76), then the fourth determining unit 25G sequentially counts the number of arrived packets in each time slot from the starting time slot in the third time period T3, and obtains the arrived-packet count PKTb of all time slots in the third time period T3 (Step S77). Then, the fourth determining unit 25G determines whether or not the arrived-packet count PKTb is obtained for the first time (Step S78).

If the arrived-packet count PKTb is obtained for the first time (Yes at Step S78), then the fourth determining unit 25G stores the current arrived-packet count PKTb as the initial packet count (Step S79). Then, the fourth determining unit 25G calculates a PKTb fluctuation amount using the absolute value of ((the current arrived-packet count PKTb)/(the SC count)−(the initial packet count)) (Step S80). Subsequently, the fourth determining unit 25G determines whether or not the PKTb fluctuation amount has exceeded the fluctuation threshold value (Step S81).

If the PKTb fluctuation amount has not exceeded the fluctuation threshold value (No at Step S81); then the fourth determining unit 25G resets the fluctuation count (Step S82). Then, the second determining unit 25B of the analyzing unit 25 determines whether or not the second time period T2 has started (Step S83). The second time period T2 is a section starting from the time slot TSc-1 in the previous observation cycle up to the completion of the burst starting point TSb of the subsequently-arriving burst section.

Figure 23:
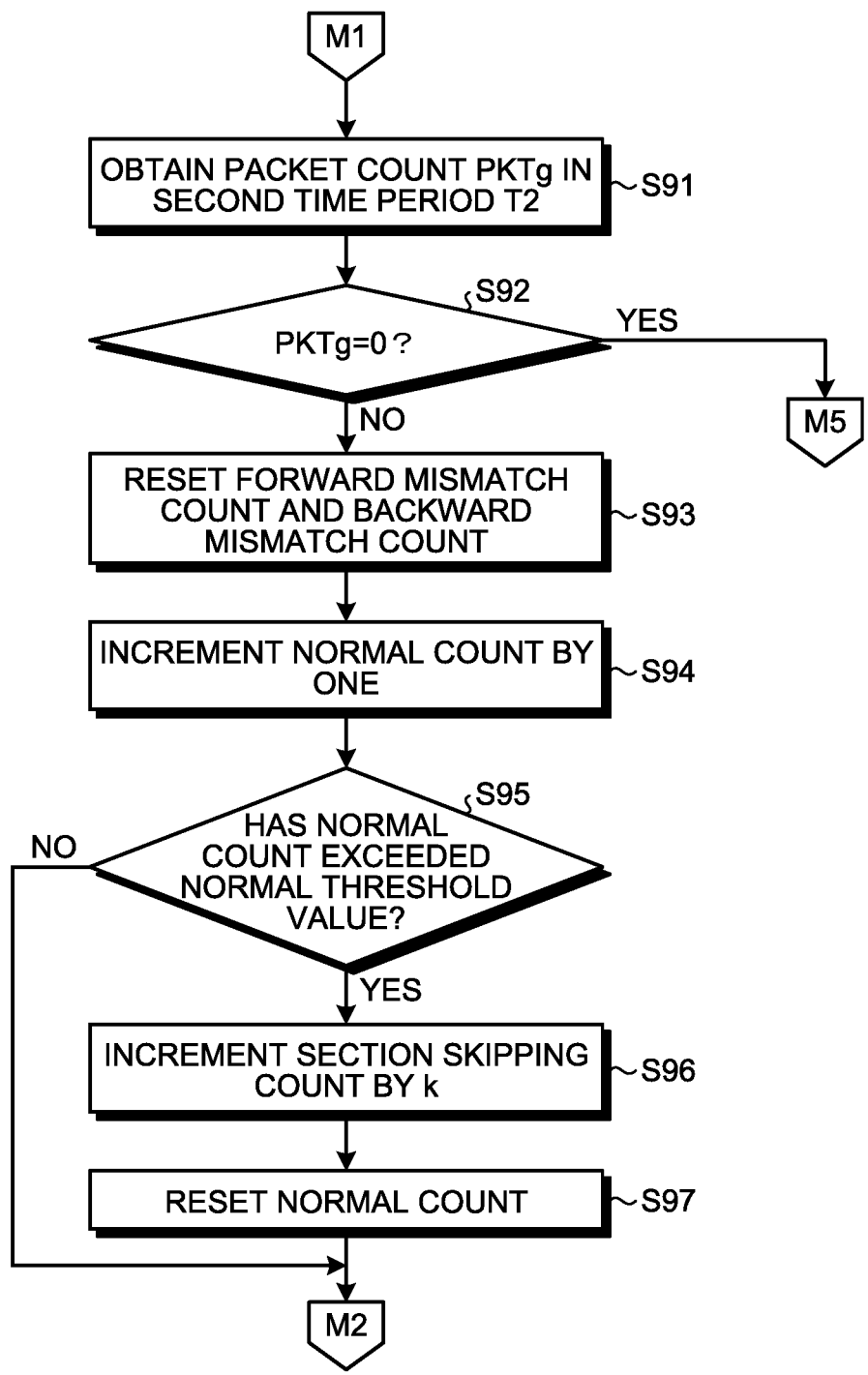

If the second time period T2 has started (Yes at Step S83), then the second determining unit 25B sequentially counts the number of packets in each time slot from the initial time slot in the second time period T2, and the system control proceeds to M1 illustrated in FIG. 23 so that the second determining unit 25B can obtain the arrived-packet count PKTg of all time slots in the second time period T2.

Meanwhile, if the first time period T1 has not started (No at Step S73), then the system control stays at Step S73 so that the first determining unit 25A can determine whether or not the first time period T1 has started. Moreover, if the third time period T3 has not started (No at Step S76), then the system control stays at Step S76 so that the fourth determining unit 25G can determine whether or not the third time period T3 has started. Furthermore, if the arrived-packet count PKTb is obtained not for the first time (No at Step S78), then the system control proceeds to Step S80 so that the fourth determining unit 25G can calculate the PKTb fluctuation amount.

If the PKTb fluctuation amount has exceeded the fluctuation threshold value (Yes at Step S81), then the fourth determining unit 25G increments the fluctuation count by one (Step S84), and determines whether or not the fluctuation count has exceeded the fluctuation detection threshold value (Step S85). If the fluctuation count has exceeded the fluctuation detection threshold value (Yes at Step S85), then the fourth determining unit 25G performs the closed time slot control operation illustrated in FIG. 10 (Step S86). Meanwhile, if the second time period T2 has not started (No at Step S83), then the system control stays at Step S83 so that the second determining unit 25B can determine whether or not the second time period T2 has started.

With reference to M1 illustrated in FIG. 23, the second determining unit 25B obtains the arrived-packet count PKTg in all time slots in the second time period T2 (Step S91), and determines whether or not the arrived-packet count PKTg is "0" (Step S92). Regarding the expected value of the arrived-packet count PKTg, the number of arrived packets from the time slot TSc-1 to the burst starting point TSb is "positive". If the arrived-packet count PKTg is not "0" (No at Step S92), then the second determining unit 25B determines that the arrived-packet count PKTg is "positive" and resets the forward mismatch count and the backward mismatch count (Step S93). Moreover, the first correcting unit 25D of the analyzing unit 25 increments the normal count by one (Step S94), and determines whether or not the normal count has exceeded the normal threshold value (Step S95).

If the normal count has exceeded the normal threshold value (Yes at Step S95), then the first correcting unit 25D increments the section skipping count SC by k (Step S96), and resets the normal count (Step S97). Then, the system control proceeds to M2 illustrated in FIG. 22, so that the first determining unit 25A can determine whether or not the first time period T1 has started.

Figure 25:
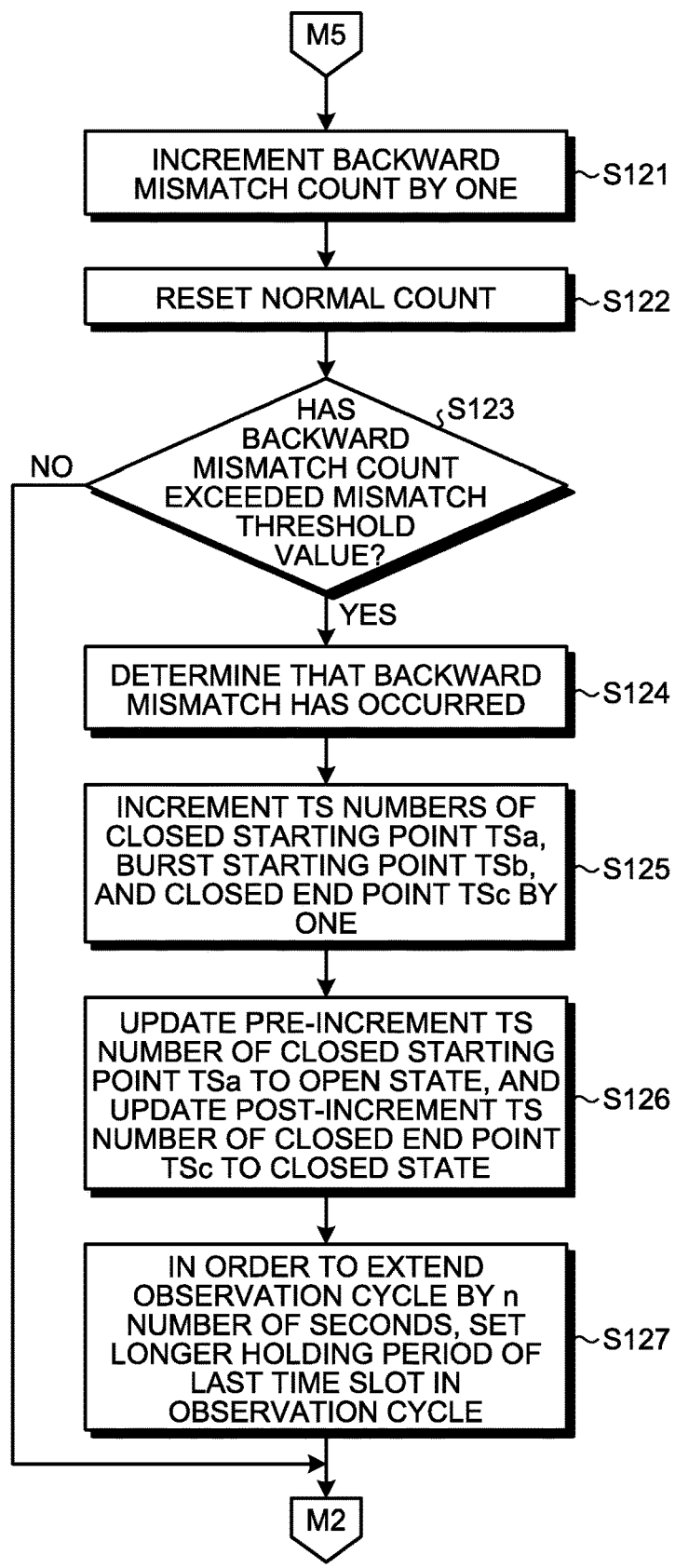

Meanwhile, if the arrived-packet count PKTg is "0" (Yes at Step S92), then the second determining unit 25B determines that backward mismatch has occurred in the observation cycle, and the system control proceeds to M5 illustrated in FIG. 25. Moreover, if the normal count has not exceeded the normal threshold value (No at Step S95), then the system control proceeds to M2 illustrated in FIG. 22, so that the first correcting unit 25D can determine whether or not the first time period T1 has started.

With reference to M3 illustrated in FIG. 24, if the arrived-packet count PKTr in the first time period T1 illustrated in FIG. 22 is "0", then the third determining unit 25F determines that a mismatch has occurred in the observation cycle and determines whether or not the arrived-packet count PKTr has exceeded a predetermined threshold value (Step S101). If the arrived-packet count PKTr has not exceeded the predetermined threshold value (No at Step S101), then the first determining unit 25A determines that there is a risk of occurrence of forward mismatch in the observation cycle and increments the forward mismatch count by one (Step S102); and resets the normal count (Step S103).

If the forward mismatch count has exceeded the mismatch threshold value (Yes at Step S104), then the first determining unit 25A determines that forward mismatch has occurred in the observation cycle (Step S105). Then, the second correcting unit 25E decrements the TS numbers of the closed starting point TSa, the burst starting point TSb, and the closed end point TSc by one (Step S106). Moreover, the second correcting unit 25E updates the list table 26 so as to set, as the setting state of the second gate 22B, the post-decrement closed starting point TSa to the closed state and the pre-decrement closed end point TSc to the open state (Step S107). Then, the second correcting unit 25E sets a shorter holding period of the last time slot in the observation cycle in order to shorten the observation cycle by m number of seconds (Step S108), and the system control proceeds to M4 illustrated in FIG. 22 so that the second correcting unit 25E can determine whether or not the third time period T3 has started.

If the arrived-packet count PKTr has exceeded the predetermined threshold value (Yes at Step S101), then the third determining unit 25F of the analyzing unit 25 increments the new-detection count by one (Yes at Step S109) and resets the normal count (Step S110). Then, the third determining unit 25F determines whether or not the new-detection count has exceeded a new-detection threshold value (Step S111). If the new-detection count has exceeded the new-detection threshold value (Yes at Step S111), then the third determining unit 25F performs the closed time slot decision operation illustrated in FIG. 10 (Step S112).

On the other hand, if the new-detection count has not exceeded the new-detection threshold value (No at Step S111), then the system control proceeds to M4 illustrated in FIG. 22 so that the fourth determining unit 25G can determine whether or not the third time period T3 has started. Meanwhile, also when the forward mismatch count has not exceeded the threshold value (No at Step S104); the system control proceeds to M4 illustrated in FIG. 22.

With reference to M5 illustrated in FIG. 25, if the arrived-packet count PKTg is "0" (Yes at Step S92), then the second determining unit 25B determines that there is a risk of backward mismatch and increments the backward mismatch count by one (Step S121); and resets the normal count (Step S122). Then, the second determining unit 25B determines whether or not the backward mismatch count has exceeded the mismatch threshold value (Step S123). If the backward mismatch count has exceeded the mismatch threshold value (Yes at Step S123), then the second correcting unit 25E determines that backward mismatch has occurred (Step S124), and increments the TS numbers of the closed starting point TSa, the burst starting point TSb, and the closed end point TSc by one (Step S125). Moreover, the second correcting unit 25E updates the list table 26 so as to set, as the setting state of the second gate 22B, the pre-increment TS number of the closed starting point TSa to the open state and the post-increment TS number of the closed end point TSc to the closed state (Step S126). The second correcting unit 25E sets a longer holding period of the last time slot in the observation cycle in order to extend the observation cycle by n number of seconds (Step S127), and the system control proceeds to M2 illustrated in FIG. 22 so that the second correcting unit 25E can determine whether or not the first time period T1 has started.

In the packet processing unit 12 according to the embodiment, the first determining unit 25A counts the number of arrived packets in the first time period T1 that is from the time slot TSc-1, which is present immediately after the closed section in the observation cycle, up to the end of the subsequently-arriving closed starting point TSa. If the counted number of arrived packets is positive, then the first determining unit 25A determines that forward mismatch has occurred in the observation cycle. Then, the second determining unit 25B counts the number of arrived packets in the second time period T2 that is from the time slot TSc-1 present after the first time period T1 up to the end of the subsequently-arriving burst starting point TSb. If the counted number of arrived packets is "0", then the second determining unit 25B determines that backward mismatch has occurred in the observation cycle. The processing load on the packet processing unit 12 can be reduced by widening the interval between the start of information collection in the first time period T1 and the start of information collection in the second time period T2. Besides, in order to reduce the load of information collection; the current mismatch range is learnt from the collection result, the collection interval is extended to the limit of being able to perform mismatch detection, the observation cycle is adjusted based on the mismatch direction and the detection interval, and the mismatch range itself can be reduced. Moreover, as a result of a decrease in the processing load, it becomes possible to have greater latitude in electricity, use of a low-performance CPU, and use of low-cost switching products.

If the normal count, which is counted when the determination result of no forward mismatch and the determination result of no backward mismatch is detected on a continuing basis, exceeds the normal threshold value; then the first correcting unit 25D of the packet processing unit 12 increases the section skipping count between the first time period T1 and the second time period T2. Thus, by further widening the interval between the start of information collection in the first time period T1 and the start of information collection in the second time period T2 while the normal state is maintained, the processing load of the packet processing unit 12 can be reduced.

If the forward mismatch count, which is counted when the determination result indicating forward mismatch is detected, exceeds the mismatch threshold value; then, in order to shorten the observation cycle, the second correcting unit 25E of the packet processing unit 12 performs correction to shorten the holding period of the last time slot from among a plurality of time slots in the observation cycle. On the other hand, if the backward mismatch count, which is counted when the determination result indicating backward mismatch is detected, exceeds the mismatch threshold value; then, in order to extend the observation cycle, the second correcting unit 25E performs correction to extend the holding period of the last time slot from among a plurality of time slots in the observation cycle. As a result, even when there is a mismatch in the observation cycle during the system operations, the cycle mismatch can be corrected.

If the new-detection count, which is counted when the number of arrived packets in the first time period T1 exceeds a predetermined threshold value, exceeds the new-detection threshold value; then, in order to reanalyze the observation cycle and the burst section, the third determining unit 25F of the packet processing unit 12 performs the closed time slot decision operation. As a result, even when there is new traffic in the operation cycle during the system operations, reanalysis of the observation cycle and the burst sections can be performed while detecting the presence of new traffic.

The fourth determining unit 25G of the packet processing unit 12 counts the number of packets in the third time period T3 that is from the time slot TSc-1 present immediately after the first period T1 up to the time slot present immediately before the second time period T2, and determines whether or not the PKTb fluctuation amount of the counted number of packets has exceeded the threshold value. If the fluctuation count, which is counted when the PKTb fluctuation amount of the arrived packets in the third time period T3 has exceeded the threshold value, exceeds the fluctuation detection threshold value; then the fourth determining unit 25G performs the closed time slot decision operation so as to reanalyze the observation cycle and the burst sections. As a result, even when there is fluctuation in the burst sections in the observation cycle during the system operations, reanalysis of the observation cycle and the burst sections can be performed while detecting the fluctuation.

The packet switches 7 refer to the list table 26, and control the first gate 22A and the second gate 22B in between the bursts that are meant for outputting MFH packets on a priority basis. Thus, the packet switches 7 can refer to the list table 26 and enable outputting MFH packets on a priority basis. Based on the cyclic pattern, the packet switches 7 identify the TS count and the TS interval of the reception packets as well as identify the setting state of the first gate 22A and the second gate 22B for each type in each time slot; and update the content of the list table 26 by the identified contents. Thus, the packet switches 7 can autonomously update the content of the list table 26, thereby enabling holding down the output delay of high-priority packets.

In the embodiment described above, the explanation is given for an example in which the second correcting unit 25E corrects the holding period of the last time slot in the observation cycle when the observation cycle is to be adjusted. However, the correction is not limited to be performed with respect to the last time slot. Alternatively, from among the time slots in the observation cycle, the time slots other than the burst sections can be subjected to correction of the holding period.

In the embodiment described above, there are two types of packets, namely, MFH packets representing high-priority packets and non-MFH packets representing low-priority packets. However, the packets are not limited to have two types of priority, and the types of priority can be appropriately varied. For example, if there are packets having three types of priority, then three gates are arranged and the setting state of each gate is stored in the list table 26.

In the embodiment described above, the sub-frames of wireless signals in a fourth-generation communication system are assumed to have intervals of 1 millisecond. However, the intervals are not limited to 1 millisecond. Alternatively, for example, in order to deal with wireless signals in a fifth-generation communication system, the sub-frames intervals can be appropriately varied.

In the embodiment described above, the analyzing unit 25, the control unit 27, and the list table 26 are included in the packet processing unit 12. Alternatively, for example, the analyzing unit 25, the control unit 27, and the list table 26 can be included in the CPU 15.

In the embodiment described above, one cycle of sub-frames is assumed to have N number of time slots. However, as long as the cyclic nature can be maintained, one cycle of sub-frames can be set in multiples of N.

The constituent elements of the device illustrated in the drawings are merely conceptual, and need not be physically configured as illustrated. The constituent elements, as a whole or in part, can be separated or integrated either functionally or physically based on various types of loads or use conditions.

Moreover, the various processing functions implemented in the devices can be entirely or partially implemented in a CPU (or a microcomputer such as a micro processing unit (MPU) or a micro controller unit (MCU)). Alternatively, the processing functions implemented in the devices can be entirely or partially implemented by computer programs that are analyzed and executed by a CPU (or a microcomputer such as an MPU or an MCU), or implemented as hardware using wired logic.

Figure 26:
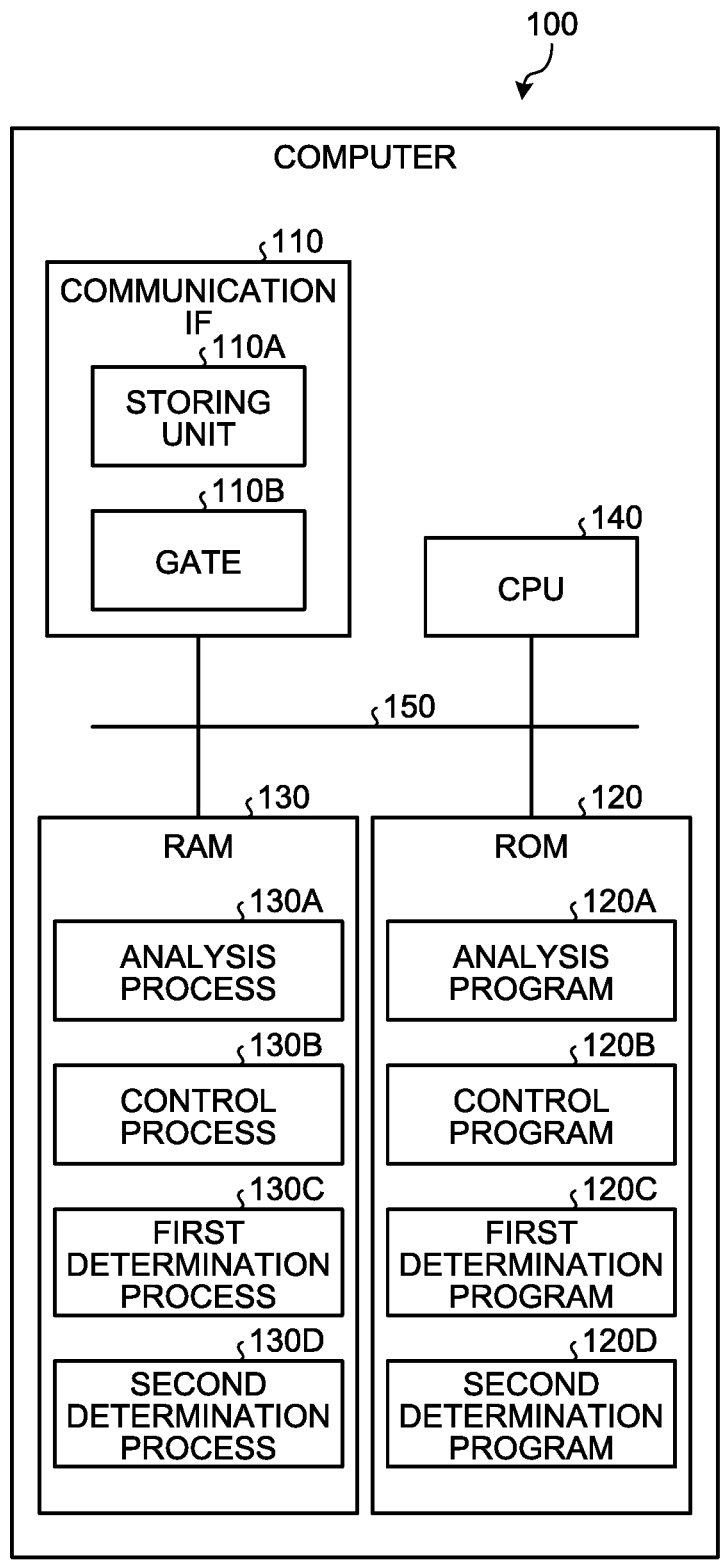
FIG. 26 is an explanatory diagram illustrating an exemplary computer that executes packet processing programs.

The various operations explained in the embodiment can be implemented when a processor such as a CPU of an information processing device executes a computer program written in advance. Given below is the explanation of an exemplary information processing device that executes a computer program having identical functions to the functions explained in the embodiment. FIG. 26 is an explanatory diagram illustrating an exemplary computer that executes packet processing programs.

As illustrated in FIG. 26, a computer 100 that executes the packet processing programs includes a communication interface (IF) 110, a read only memory (ROM) 120, a random access memory (RAM) 130, and a CPU 140. The communication IF 110, the ROM 120, the RAM 130, and the CPU 140 are connected to each other via a bus 150. The communication IF 110 receives packets. The computer 100 processes the arrived packets that are received in each time slot having a predetermined period of time. The communication IF 110 includes a plurality of storing units 110A for storing the arrived packets according to the types of arrived packets, and includes a gate 110B for opening and closing the output of the storing units 110A.

The ROM 120 is used to store in advance the packet processing programs that implement identical functions to the functions explained in the embodiment. The packet processing programs in the ROM 120 include an analysis program 120A, a control program 120B, a first determination program 120C, and a second determination program 120D. However, instead of storing the packet processing programs in the ROM 120, they can be recorded in a computer-readable recording medium using a drive (not illustrated). Examples of the recording medium include a portable recording medium such as a compact disc read only memory (CD-ROM), a digital versatile disc (DVD), or a universal serial bus (USB) memory; and a semiconductor memory such as a flash memory.

The CPU 140 reads the analysis program 120A from the ROM 120, and loads it as an analysis process 130A in the RAM 130. Moreover, the CPU 140 reads the control program 120B from the ROM 120, and loads it as a control process 130B in the RAM 130. Furthermore, the CPU 140 reads the first determination program 120C from the ROM 120, and loads it as a first determination process 130C in the RAM 130. Moreover, the CPU 140 reads the second determination program 120D from the ROM 120, and loads it as a second determination process 130D in the RAM 130.

Based on the number of arrived packets in each time slot, the CPU 140 measures burst sections in which the packets arrive and measures the observation cycle in which the burst sections are observed. The CPU 140 controls the opening and closing of the gates in the burst sections, and in the priority section in which the arrived packets of predetermined types are output on a priority basis. The CPU 140 counts the number of arrived packets in the first period of time that is from the time slot present immediately after the priority section up to the end of the initial time slot in the subsequently-arriving priority section; and, if the counted number of arrived packets is positive, determines that forward mismatch has occurred in the observation cycle. Similarly, the CPU 140 counts the number of arrived packets in the second period of time that is from the time slot present immediately after the priority section present after the first period up to the end of the initial time slot of the burst sections in the subsequently-arriving priority section; and, if the counted number of arrived packets is "0", determines that backward mismatch has occurred in the observation cycle. As a result, while holding down the output delay of high-priority packets, the processing load can be reduced by widening the interval between information collection in the first period and information collection in the second period.

As an aspect of the invention, it becomes possible to hold down the output delay of high-priority packets.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A packet processing device that processes arrived packets which are received in each time slot having a predetermined period of time, the packet processing device comprising:
 a plurality of memories configured to store the arrived packets according to types of the arrived packets; and
 a processor configured to:
 open and close output of each of the memories;
 measure, based on number of the arrived packets in each time slot, a burst section in which the arrived packets arrive and measure an observation cycle in which the burst section is observed;
 control the opening and the closing for a priority section which includes the burst section and a section including time slot present immediately before the burst section and time slot present immediately after the burst section and in which the arrived packets of predetermined types are output on a priority;
 count a first number of the arrived packets in a first period of time which is from time slot present immediately after the priority section up to end of initial time slot in a first priority section arriving subsequently;
 determine, when the counted first number of the arrived packets is positive, that a forward mismatch has occurred in the observation cycle;
 count a second number of the arrived packets in a second period of time which is from time slot present immediately after the first priority section up to end of initial time slot of the burst section in a second priority section arriving subsequently; and
 determine, when the counted second number of the arrived packets is "0", that a backward mismatch has occurred in the observation cycle.

2. The packet processing device according to claim 1, wherein the processor is further configured to correct a skipping section between the first period of time and the second period of time in an increasing direction, when a normal count, which is counted when the determining obtains the determination result of no forward mismatch on a continuing basis and when the determining obtains the determination result of no backward mismatch on a continuing basis, exceeds a normal threshold value.

3. The packet processing device according to claim 1, wherein the processor is further configured to correct an interval of arbitrary time slots from among a plurality of time slots in the observation cycle, so that
 the observation cycle is shortened when the determining obtains the determination result of indicating the forward mismatch, and
 the observation cycle is extended when the determining obtains the determination result of indicating the backward mismatch.

4. The packet processing device according to claim 1, wherein the processor is further configured to determine whether or not the number of the arrived packets in the first period of time has exceeded a first threshold value; and
 the measuring again measures the observation cycle and the burst section, when the determining determines that the number of the arrived packets in the first period of time has exceeded the first threshold value.

5. The packet processing device according to claim 1, wherein the processor is further configured to:
 count a third number of the arrived packets in a third period of time which is from time slot present immediately after the first period of time up to time slot present immediately before the second period of time; and
 determine whether or not a fluctuation amount of the counted third number of the arrived packets in the third period exceeds a second threshold value, and wherein
 the measuring again measures the observation cycle and the burst section, when the determining determines that the fluctuation amount of the third number of the arrived packets in the third period of time exceeds the second threshold value.

6. A packet processing method for processing arrived packets which are received in each time slot having a predetermined period of time,
 the packet processing method comprising:
 measuring, based on number of the arrived packets in each time slot, a burst section in which the arrived packets arrive and measuring an observation cycle in which the burst section is observed;
 controlling opening and closing of each gate for a priority section which includes the burst section and a section including time slot present immediately before the burst section and time slot present immediately after the burst section and in which the arrived packets of predetermined types are output on a priority, the gate configured to open and close output of each of a plurality of memories to store the arrived packets according to types of the arrived packets;
 counting a first number of the arrived packets in a first period of time which is from time slot present immediately after the priority section up to end of initial time slot in a first priority section arriving subsequently;
 determining, when the counted first number of the arrived packets is positive, that a forward mismatch has occurred in the observation cycle;
 counting a second number of the arrived packets in a second period of time which is from time slot present immediately after the first priority section up to end of initial time slot of the burst section in a second priority section arriving subsequently; and
 determining, when the counted second number of the arrived packets is "0", that a backward mismatch has occurred in the observation cycle.

* * * * *